(12) United States Patent
Bourne

(10) Patent No.: US 11,044,234 B2
(45) Date of Patent: *Jun. 22, 2021

(54) COMMUNICATING WITH A DEVICE

(71) Applicant: VODAFONE IP LICENSING LTD, Newbury (GB)

(72) Inventor: Sophie Bourne, New Berkshire (GB)

(73) Assignee: VODAFONE IP LICENSING LTD, Newbury (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/357,727

(22) Filed: Mar. 19, 2019

(65) Prior Publication Data
US 2019/0306123 A1 Oct. 3, 2019

Related U.S. Application Data

(62) Division of application No. 15/021,913, filed as application No. PCT/GB2014/052777 on Sep. 12, 2014, now Pat. No. 10,313,308.

(30) Foreign Application Priority Data

Sep. 13, 2013 (GB) .................................... 1316370
Oct. 16, 2013 (GB) .................................... 1318339
(Continued)

(51) Int. Cl.
*H04W 12/04* (2021.01)
*H04L 29/06* (2006.01)
(Continued)

(52) U.S. Cl.
CPC ............ *H04L 63/04* (2013.01); *G06F 9/4401* (2013.01); *G06F 13/1689* (2013.01);
(Continued)

(58) Field of Classification Search
CPC .... H04W 12/04; H04L 63/062; H04L 9/0819; H04L 9/0827
See application file for complete search history.

(56) References Cited

U.S. PATENT DOCUMENTS 8,122,240 B2 2/2012 Blom et al.
8,868,912 B2 10/2014 Blom et al.
(Continued)

FOREIGN PATENT DOCUMENTS

WO WO-2007/042345 4/2007
WO WO-2008058841 5/2008
(Continued)

OTHER PUBLICATIONS

WO 2008058841 A2 EPO machine translation (Year: 2008).*
(Continued)

*Primary Examiner* — David J Pearson
(74) *Attorney, Agent, or Firm* — B. Aaron Schulman, Esq.; Stites & Harbison, PLLC

(57) ABSTRACT

The present disclosure provides a method and apparatuses configured for identifying a server instance in communications between an entity and a bootstrapping server. In particular, the method is directed to sending a data communication between the entity and the bootstrapping server, wherein the data include a pointer to the server instance. In addition, the bootstrapping server is configured to set, in at least part of data to be communicated to an entity, a pointer to a security server instance.

20 Claims, 6 Drawing Sheets

(30) Foreign Application Priority Data

| May 30, 2014 | (GB) | 1409641 |
|---|---|---|
| May 30, 2014 | (GB) | 1409643 |
| May 30, 2014 | (GB) | 1409652 |
| May 30, 2014 | (GB) | 1409663 |
| Aug. 22, 2014 | (GB) | 1414997 |
| Aug. 22, 2014 | (GB) | 1414999 |
| Aug. 22, 2014 | (GB) | 1415003 |
| Sep. 9, 2014 | (GB) | 1415921 |

(51) Int. Cl.

| H04W 4/70 | (2018.01) |
|---|---|
| H04W 4/50 | (2018.01) |
| H04W 4/14 | (2009.01) |
| H04W 12/02 | (2009.01) |
| H04W 88/02 | (2009.01) |
| H04W 88/06 | (2009.01) |
| H04L 29/08 | (2006.01) |
| H04W 28/08 | (2009.01) |
| H04W 80/06 | (2009.01) |
| H04W 12/37 | (2021.01) |
| H04W 12/0431 | (2021.01) |
| G06F 21/60 | (2013.01) |
| H04B 1/3816 | (2015.01) |
| G06F 13/16 | (2006.01) |
| G06F 13/28 | (2006.01) |
| G06F 13/40 | (2006.01) |
| H04W 4/12 | (2009.01) |
| H04W 12/06 | (2021.01) |
| H04W 52/02 | (2009.01) |
| G06F 21/71 | (2013.01) |
| H04L 9/08 | (2006.01) |
| H04W 8/04 | (2009.01) |
| G06F 9/4401 | (2018.01) |

(52) U.S. Cl.
CPC .......... *G06F 13/28* (2013.01); *G06F 13/4027* (2013.01); *G06F 21/606* (2013.01); *G06F 21/71* (2013.01); *H04B 1/3816* (2013.01); *H04L 9/0861* (2013.01); *H04L 63/0428* (2013.01); *H04L 63/0442* (2013.01); *H04L 63/061* (2013.01); *H04L 63/062* (2013.01); *H04L 63/08* (2013.01); *H04L 63/0823* (2013.01); *H04L 63/0869* (2013.01); *H04L 63/0876* (2013.01); *H04L 63/10* (2013.01); *H04L 63/166* (2013.01); *H04L 63/20* (2013.01); *H04L 67/1095* (2013.01); *H04L 67/125* (2013.01); *H04L 67/42* (2013.01); *H04W 4/12* (2013.01); *H04W 4/14* (2013.01); *H04W 4/50* (2018.02); *H04W 4/70* (2018.02); *H04W 8/04* (2013.01); *H04W 12/02* (2013.01); *H04W 12/04* (2013.01); *H04W 12/0431* (2021.01); *H04W 12/06* (2013.01); *H04W 12/37* (2021.01); *H04W 28/08* (2013.01); *H04W 52/0229* (2013.01); *H04W 80/06* (2013.01); *H04W 88/02* (2013.01); *H04W 88/06* (2013.01); *H04L 63/0838* (2013.01); *H04L 2463/061* (2013.01); *Y02D 10/00* (2018.01); *Y02D 30/70* (2020.08)

(56) References Cited

U.S. PATENT DOCUMENTS

| 2003/0123669 | A1 | 7/2003 | Koukoulidis et al. |
| 2006/0251257 | A1 | 11/2006 | Haverinen et al. |
| 2007/0086591 | A1 | 4/2007 | Blom et al. |
| 2009/0083861 | A1* | 3/2009 | Jones ............... H04L 63/0892 726/29 |
| 2009/0138955 | A1 | 5/2009 | Vinayakray-Jani |
| 2010/0177663 | A1 | 7/2010 | Johansson et al. |
| 2010/0199095 | A1 | 8/2010 | Ho |
| 2011/0010543 | A1 | 1/2011 | Schmidt et al. |
| 2011/0116382 | A1* | 5/2011 | McCann ............... H04W 12/12 370/241 |
| 2011/0126017 | A1* | 5/2011 | Blom ............... H04L 63/0892 713/171 |
| 2011/0320802 | A1 | 12/2011 | Wang et al. |
| 2012/0166802 | A1 | 6/2012 | Blom et al. |
| 2012/0222091 | A1* | 8/2012 | Castellanos Zamora .............. H04W 12/06 726/3 |
| 2013/0275758 | A1 | 10/2013 | Marlow |
| 2014/0079219 | A1 | 3/2014 | Yigit et al. |
| 2015/0143126 | A1 | 5/2015 | Blom et al. |
| 2015/0237502 | A1 | 8/2015 | Schmidt et al. |
| 2015/0373532 | A1* | 12/2015 | Strom ............... H04W 8/186 455/435.1 |

FOREIGN PATENT DOCUMENTS

| WO | WO-2013113162 | 8/2013 |
| WO | WO-2013120225 | 8/2013 |

OTHER PUBLICATIONS

European Examination Report dated Dec. 5, 2019, 2019 in corresponding European Patent Application No. 1415921.4.
Nokia; "BSF discovery in a large network"; 3GPP Draft; S3-080172-BSF discovery 3$^{rd}$ Generation Patnership Project (3GPP), Mobile Competence Centre; 650, route de Lucioles; F-06921 Sophia-Antipolis Cedex; France; Feb. 18, 2008.
European Examination Report dated Nov. 6, 2019 in corresponding European Patent Application No. 14 14997.5.
European Examination Report dated Nov. 27, 2019 in corresponding European Patent Application No. 1415003.1.
Open Mobile Alliance (OMA); "Lightweight Machine to Machine Technical Specification"; OMA-TS-LightweightM2M-V1_0-20130912-D_RM; Sep. 12, 2013; XP064164725.
ETSI TS 102 690 V1.2.1 (Jun. 2013); "Machine-to-Machine communications (M2M); Functional architecture"; Jun. 1, 2013; XP014156987.
Exalted; Expanding LTE for Devices; "WP4—End-To-End (E2E) M2M System D4.3 Device Management"; ExaltedWP4D43; Oct. 31, 2012.
Becker, et al,; "The Constrained Application Protocol for Pervasive M2M Communications", PERCOM Workshops, 2012 IEEE, Mar. 19-23, 2012, Lugano, pp. 483-485. E-ISBN: 978-1-4673-0906-6.
Examination Report dated Jun. 17, 2020 in application GB1415927.1.
Examination Report dated Jun. 23, 2020 in corresponding application GB 1409663.0.
Menezes, et al, "Handbook of Applied Cryptography", 1997, pp. 22-25 and 551-553, CRC Press.
Examination Report dated Nov. 5, 2020 in GB Application No. 2016853.0.
TS 33.223 v11.0.0 "Technical Specification Group Services and System Aspects; Generic Authentication Architecture (GAA); Generic Bootstrapping Architecture (GBA) Push function (Release 11)", Sep. 19, 2012.
TS 33.220 v12.1.0 "Technical Specification Group Services and System Aspects; Generic Authentication Architecture (GAA); Generic Bootstrapping Architecture (GBA) (Release 12)", Jun. 26, 2013.
Examination Report dated Oct. 13, 2020 in GB Application No. 1415003.1.
Open Mobile Alliance (OMA); "Lightweight Machine to Machine Technical Specification Candidate Version 1.0"; OMA-TS-LightweightM2M-V1_0-20131210-C; Dec. 10, 2013; Available from:

(56) References Cited

OTHER PUBLICATIONS member.openmobilealliance.org/ftp/Public_documents/DM/LightweightM2M/Permanent_documents/[Accessed Oct. 8, 2020].
European Search Report dated Nov. 27, 2020 in European Application No. 20 19 5438.
Chu, et al, "OM ADM v1.x compliant Lightweight Device Management for Constrained M2M devices", Aug. 5, 2013, pp. 517-531, Eur. Trans. Telecomms., XP05515504.
"OneM2M-TR-0002-Architecture Analysis Part 1-V-0.2.0 Architecture Analysis—Part 1: Analysis of architectures proposed for consideration by oneM2M", Jul. 28, 2013, XP055154643.

\* cited by examiner

COMMUNICATING WITH A DEVICE

CROSS-REFERENCE TO RELATED APPLICATIONS

This application is a divisional of U.S. patent application Ser. No. 15/021,913, having a filing date of Mar. 14, 2016, which is a 371 application of International Application PCT/GB2014/052777, filed Sep. 12, 2014, and which claims the benefit of UK application 1415921.4, filed Sep. 9, 2014; UK application 1414997.5, filed Aug. 22, 2014; UK application 1414999.1, filed Aug. 22, 2014; UK application 1415003.1, filed Aug. 22, 2014; UK application 1409663.0, filed May 30, 2014; UK application 1409643.2, filed May 30, 2014; UK application 1409641.6, filed May 30, 2014; UK application 1409652.3, filed May 30, 2014; UK application 1318339.7, filed Oct. 16, 2013; and UK application 1316370.4, filed Sep. 13, 2013, all of said applications incorporated herein by reference.

FIELD OF THE INVENTION

The present invention relates to a method, apparatus and system for identifying a server instance in communications between an entity and a bootstrapping server.

BACKGROUND OF THE INVENTION

Machine to Machine (M2M) devices are often numerous, hard-to-reach, and have constrained capabilities (owing to low cost, small size, low processing power or limited battery life). All of this makes their management, often remote, very complicated.

Moreover, M2M devices often need to be managed in a secure manner. For example, they may contain information that is commercially sensitive and/or confidential for the one or more entities that manage and/or own said devices. There is a need to remotely manage them in a secure way, while respecting these constraints.

The M2M device needs to be able to contact a device management (DM) server in a secure manner. Whilst at the time of manufacture the device may be pre-provisioned with the necessary addresses and URLs to locate this DM server, this requires device suppliers to have knowledge about the device's end users. Furthermore, should the addresses or locations of the DM server change then the M2M devices will require updating to prevent communications from becoming lost or misdirected.

Therefore, there is required a system and method that allows the M2M devices to communicate more reliably and more securely.

In the 3GPP generic bootstrapping architecture (GBA), the M2M device may obtain data from a bootstrapping server function (BSF) so that a shared secret can be established between the M2M device and a network application function (NAF) with which the M2M device is in communication. The shared secret may then be used by the M2M device and the NAF to establish secure communication.

However, in scaled or distributed architecture, there may be multiple instances of the BSF server and/or multiple NAF servers, for example, to provide load-balancing, resilience and/or geographical redundancy. Consequently, the interface between the device and the BSF may terminate at a different BSF instance to that of a request from the NAF (or DM server) to the BSF. The NAF (or DM server) might request a device security association (and NAF keys) from the BSF, but since it has contacted the "wrong" BSF instance, the BSF would not be able to provide the security association for the relevant device.

Details of 3GPP Standards and Technologies Used to Implement Aspects of the Method and System One of these architectures of 3GPP is a Generic Authentication Architecture (GAA), which is a complex of standards which is described, for example, in 3GPP TS 33.919 (entitled "3G Security; Generic Authentication Architecture (GAA); System description", currently it may be retrieved at http://www.3gpp.org/ftp/Specs/html-info/33919.htm).

Generic Bootstrapping Architecture (GBA) is a 3GPP standard defined in 3GPP TS 33.220 (entitled "Generic Authentication Architecture (GAA); Generic Bootstrapping Architecture (GBA)", it could be currently retrieved at http://www.3gpp.org/ftp/specs/html-info/33220.htm). GBA is part of the complex of standards called GAA (see above).

GBA is a standard which enables a shared secret to be derived (bootstrapped) from the existing security association between a mobile network and a SIM card. This involves a network element called a Bootstrapping Server Function (BSF). In other words, GBA leverages the security of a SIM card (UICC) to authenticate mobile equipment, and then derive key material for general-purpose applications.

GBA may be advantageously used to provide high-security to the communication between a client and the server, thus allowing remotely managing, controlling and, in general, communicating with a device in a high security manner. In particular, GBA (or a GBA-like architecture) is used for enabling a secure communication with the device (which, according to an aspect of the present disclosure, may be an M2M device), said communication being between a server and a client, the client being associated with the device, and wherein this communication is done for managing the device and/or services provided by (or via) the device, thus enabling a secure management of that device and/or the services provided by (or via) the device. In this way, the device and/or the services provided by (or via) the device can be safely, securely and efficiently managed in a remote manner via a remote server.

GBA has been developed mainly for securing mobile broadcast (e.g. pay TV and equivalents). Indeed, standards for Multimedia Broadcast Multicast Service (MBMS) rely on GBA. Similarly, Open Mobile Alliance (OMA) Mobile Broadcast Services Enabler Suite (BOAST) smartcard profile relies on GBA. To date, most of the limited number of deployments of GBA in the world has been for mobile broadcast. GBA has also been standardised as an optional feature in conjunction with presence services, and within miscellaneous "federated identity" services (e.g. Liberty Alliance, OpenID). In general, it is understood that GBA has been designed for use with mobile devices, such as mobile phones, laptop, computers, and many of the designed features have been provisioned with this in mind.

A variant of GBA, called "GBA Push", has been proposed for securing a message between a client and a DM server in the context of OMA Device Management Security. The OMA Device Management is specifically designed for management of mobile devices such as mobile phones, tablet, computers, etc.

A different recent standard document (TS 102 690) merely mentions, in the context of M2M communications, the use of a standard GBA to secure communications between a device/gateway service layer and a network service layer.

There are some alternatives for identifying/authenticating a mobile user/device to a service. All of these alternatives are simpler than using GBA. For example, mobile operators and service providers can use WAP header enrichment.

Alternatively, the service provider can request the user to enter their phone number, send an SMS one-time password to that phone number, and ask the user to read the SMS and enter the password. These alternatives all work well with mobile devices and operators already, so service providers use them, although they are not as secure as GBA.

Additionally, many service providers prefer to offer services to a huge range of mobile devices, many of which do not contain a SIM card (e.g. PCs, laptops, Wi-fi-only tablets etc.). Since GBA relies on a SIM card/UICC in order to work, there has been no interest in using it.

Strong security is not possible with current alternatives such as a user-entered PIN or a bootstrapping message delivered by an SMS. These alternatives would either not be feasible or they would not provide the required level of security. First, there might not be a user around to enter a PIN (as most M2M devices operate independently from human intervention). Second, the service provider may be likely to want strong security (e.g. because M2M devices may include critical infrastructure), whereas PIN-based bootstrapping has weaker security. Third, if a PIN or SMS-based bootstrapping goes wrong (server connects to wrong client, client connects to wrong server, or there is a Man-In-The-Middle), then the user is likely to notice, complain and get it fixed, whereas an M2M device is unlikely to notice and complain, so may be permanently compromised. Neither is particularly practical by way of existing methods. For example, the OMA Device Management uses GBA Push for securing a message between a client and a DM server, and there is no explanation of how a similar architecture could be used or even modified for managing the device. Moreover, as mentioned above, the OMA Device Management is not compatible for use with an M2M device, as discussed above. This is particularly true for low cost, simple M2M devices, such as simple sensors, switches, low cost trackers etc. Further, the standard document mentioned above uses a standard GBA to secure communications between a device/gateway service layer and a network service layer. Thus, the communication is not used for device/service management-related communications, and it is not clear, based on the observations made above, how a similar architecture could be used or even modified for managing the device from the server. Moreover, for the reasons mentioned above, the OMA Device Management and the standard document are incompatible, and a combination of the GBA Push for OMA Device Management with the standard document is not feasible, as it would result in the wrong device management protocol (i.e. one that is not suitable for M2M devices, particularly simple M2M devices), and some very laborious effort to make the two compatible and delete the elements which are redundant.

The OMA has defined a lightweight protocol for managing (as well as interacting with) M2M devices and managing services provided by M2M devices (e.g. remote control of attached sensors or machines). This protocol is called LWM2M, which is described in detail at http://technical.openmobilealliance.Org/Technical/release_program/lightweightM2M_v1_0.a spx This protocol runs over the CoAP protocol (analogous to http)—more specifically CoAP over DTLS (coaps) which is analogous to http over TLS (https). However, coaps requires a secure association to be provisioned between a device and a network server (DM Server) while providing no strong means to provision such an association from scratch.

A security aspect of OMA LWM2M is defined in Lightweight Machine to Machine Technical Specification Candidate Version 1.0-10 December 2013 (OMA-TS-LightweightM2M-V1_0-20131210-C).

In addition, there exists two protocols, the first one called DTLS defined in RFC 6347 (entitled "Datagram Transport Layer Security Version 1.2"; it could be currently retrieved at http://tools.ietf.org/html/rfc6347); the second one called CoAP defined in draft-ietf-core-coap-18 (entitled "Constrained Application Protocol (CoAP)"; it could be currently retrieved at http://datatracker.ietf.org/doc/draft-ietf-core-coap/). Both protocols are currently used in LWM2M. CoAP is still only an IETF draft (not a full RFC), and DTLS version 1.2 is also comparatively new (January 2012): versions of TLS have often existed as RFCs for several years before receiving widespread adoption.

The User Datagram Protocol (UDP) channel security for [COAP] is defined by the Datagram Transport Layer Security (DTLS) [RFC6347], which is the equivalent of TLS v1.2 [RFC5246] for HTTP and utilizes a subset of the Cipher Suites defined in TLS. (Refers to TLS Cipher Suite registry http://www.iana.org/assignments/tls-parameters/tls-parameters.xml) The DTLS binding for CoAP is defined in Section 9 of [CoAP]. DTLS is a long-lived session based security solution for UDP. It provides a secure handshake with session key generation, mutual authentication, data integrity and confidentiality.

The keying material used to secure the exchange of information within a DTLS session may be obtained using one of the bootstrap modes defined in Section 5.1.2 Bootstrap Modes of OMA LWM2M. The formats of the keying material carried in the LWM2M Security Object Instances are defined in Appendix E.1.1.

There also exists an authentication protocol HTTP Digest authentication, which is defined in RFC 331 0 (entitled "Hypertext Transfer protocol (HTTP) Digest Authentication using Authentication and Key Agreement (AKA)", it can currently be retrieved at http://www.ietf.org/rfc/rfc3310.txt).

The GAA cluster of specifications TS 33.222 (entitled "Generic Authentication Architecture (GAA); Access to network application functions using Hypertext Transfer Protocol over Transport Layer Security (HTTPS)") defines a general approach for pre-shared key TLS (TLS-PSK, RFC 4279). This can currently be retrieved at http://www.3gpp.org/ftp/Specs/html-info/33222.htm). For example, see especially Section 5.4.

In particular, with reference to GBA, 3GPP Specification TS 33.220 defines the components and interfaces that are shown in FIG. 1. These are further described as:

NAF 122, the "Network Application Function" is a server-side component of an application that will be secured using GBA.

BSF, "Bootstrapping Server Function", 130 is a server-side component, which obtains authentication vectors from the HLR/HSS 140, and sends a challenge to the mobile device, "UE", 1 10 during the GBA protocol. On successful authentication, it derives the shared secret.

HLR/HSS 140, the "Home Location Register" or "Home Subscriber System", is the existing 3GPP system which stores subscription details and credentials (the K and IMSI) for each SIM card (UICC) issued by a mobile operator. It may be "GBA-aware" (so that it stores details for a GBA user subscription) or may be a legacy component. UE, the "User Equipment", 1 10 is a mobile device containing a SIM card (UICC). The UE 1 10 supports a client application which communicates with the NAF 122, as well as a service which interfaces to the UICC, communicates with the BSF 130, and derives the shared secret before passing it to the client application. This service is (somewhat confusingly) called a "GAA Server" in TR 33.905 (entitled "Recommendations for Trusted Open Platforms", it can currently be retrieved at http://www.3gpp.org/ftp/specs/htmlinfo/33905.htm).

Ua 150 is the interface between the Mobile Device (UE) 110 and the Network Application Function (NAF) 120.

Ub 160 is the interface between the Mobile Device (UE) 110 and the Bootstrapping Server Function (BSF) 130. This is specified in detail in TS 24.109 (entitled "Bootstrapping interface (Ub) 160 and network application function interface (Ua) 150; Protocol details", it can currently be retrieved at http://www.3gpp.org/ftp/Specs/html-info/24109.htm).

Zh/Zh' 180 is the interface between the BSF 130 and the HSS or HLR 140. The Zh 180 interface is used with an HSS 140 that is "GBA Aware". The Zh' 180 interface is used with a legacy HLR or HSS 140. The Zh and Zh' 180 interfaces are specified in detail in TS 29.109 (entitled "Generic Authentication Architecture (GAA); Zh and Zn Interfaces based on Diameter protocol; Stage 3", it can currently be retrieved at http://www.3gpp.org/ftp/Specs/html-info/29109.htm) and TS 29.229 (entitled "Cx and Dx interfaces based on the Diameter protocol; protocol details", it can currently be retrieved at http://www.3gpp.org/ftp/Specs/html-info/29229.htm).

Zn 170 is the interface between the NAF 122 and the BSF 130: this can use either a Web Services protocol (SOAP over http) or the Diameter protocol (RFC 3588). This is specified in detail in TS 29.109 (see above).

There are a few other components and interfaces defined within the GAA standards, but these are not described in detail here.

There are several different versions of GBA defined in the standards. The flavours of GBA may include GBA-ME, GBA-U, GBA-SIM etc. The version called "GBA-ME" may require no special customizations of the UICC, except that the UICC does contain a 3G SIM (a USIM). However, other versions may be used. There may be a need to use the 2G variant of GBA (using a SIM rather than a USIM).

SUMMARY OF THE INVENTION

The present disclosure provides a method of identifying a server instance in communications between an entity and a bootstrapping server (for example, a BSF), the method comprising: sending a data communication between the entity and the bootstrapping server, wherein the data comprises a pointer to the server instance.

The entity may be any entity that is capable of communicating with a bootstrapping server. For example, it may be a User Equipment device (UE), or a machine-to-machine device (M2M device), or a network application function (NAF), or a device management server (DM server) etc.

The pointer may be anything that enables a network or routing structure to route a communications interface to a particular server instance indicated by the pointer and/or that enables any other apparatus, for example a server, to identify a particular server instance.

The data communication between the bootstrapping server and the entity may be in either direction, i.e., communication from the bootstrapping server to the entity, or from the entity to the bootstrapping server.

The method may find particular application with distributed or cluster architecture server arrangements, wherein a server function may be made up of multiple server instances. For example, in a 3GPP generic bootstrapping architecture (GBA), the bootstrapping server may comprise multiple server instances. In a bootstrapping architecture (for example, GBA), an entity (for example a UE, or M2M device, or NAF) may need to communicate with the bootstrapping server to obtain bootstrapping related information, for example to establish a shared secret, or to obtain an established shared secret or a lifetime of an established shared secret in order later to establish secure communication etc. It may be useful for the entity to communicate with a particular bootstrapping server instance in order to carry out a bootstrapping procedure to establish the shared secret, or in order to obtain data (such as an established shared secret), as part of a process of establishing secure communications.

By including a pointer to a particular server instance in the data communicated from the entity to the bootstrapping server, an interface between the entity and the server instance may be routed to the correct server instance so that any requested data may be correctly returned to the entity. In communication from the bootstrapping server to the entity (for example, as part of a bootstrapping process), the bootstrapping server instance may set the pointer to identify itself as the server instance that took part in a bootstrapping process. Thus, the entity (or any other entity to whom the pointer is subsequently passed) may include the pointer (either as a part of any other data, or on its own) in future communication with the bootstrapping server, such that the communication interface to the bootstrapping server may be routed to the correct server instance.

Additionally, or alternatively, the pointer in the data may point to any other apparatus, for example any other server, such as a Home Location Register (HLR) or Home Subscriber Server (HSS). For example, in communications from the bootstrapping server to the entity, the bootstrapping server may set the pointer to indicate a particular server instance (for example, a particular HLR or HSS that has been used as part of a bootstrapping process). Thus, in any future communications from the entity (or any other entity to whom the pointer is subsequently passed) to the bootstrapping server, the entity may include the pointer (either as part of any other data, or on its own) and the bootstrapping server may use it to identify the relevant server instance that it may contact to obtain any required data.

Thus, by including a pointer to a server instance in communications between a bootstrapping sever and an entity, the identification of a particular server instance is enabled, which may be useful in routing a communications interface between the entity and the server instance, and/or in retrieving data from the server instance.

The entity may be an M2M device or a UE and the data communication may be part of a bootstrapping process for establishing a shared secret shared between the bootstrapping server and the M2M device or UE. The bootstrapping server may itself store the shared secret or data using which the shared secret may be derived, or the shared secret or data using which it may be derived may be stored in a different location that is accessible to the bootstrapping server, for example a database.

The bootstrapping process may be based on any suitable bootstrapping architecture or protocol. For example, it may be based on Generic Bootstrapping Architecture, GBA, or a GBA-like architecture, or a device management, DM, bootstrapping protocol etc. The GBA used may be any flavour or variant of GBA, for example GBA-U, 2G-GBA, GBA push etc.

Preferably, the pointer is used to select the server instance from a plurality of server instances, for example a bootstrapping server instance that is part of a cluster or partition array of server instances making up a bootstrapping server.

The data communication may comprise a request to initiate the bootstrapping process, for example a GET request.

The data may comprise an identifier of the M2M device or UE, wherein the pointer to the server instance is at least part of the identifier of the M2M device or UE (such as an IMPI, IMS I, TMPI, TMSI, MSISDN, IMPU, or any other means of identifying an M2M device or UE). For example, the identifier may contain designated components (for example, certain bits or bytes, or a domain name component, etc), that may identify the relevant server instance.

The method may further comprise a step of: routing an interface for communication between the M2M device or UE and the instance of the bootstrapping server using at least the pointer (as explained above). For example, a network routing entity may perform the routing and/or the bootstrapping server may perform the routing to a particular bootstrapping server instance etc.

Where the identified server instance comprises an HLR or HSS, the method may further comprise a step of retrieving bootstrapping data, for example data using which a shared secret may be derived (such as an authentication vector, or a CK and IK or a Ks) from the HLR or HSS that is indicated by the pointer.

In one example, the pointer may be used to advise of which server instance has been selected from a plurality of server instances. For example, the pointer may be set by the bootstrapping server and included in communications from the bootstrapping server to the entity (for example, as part of a bootstrapping process) to advise of a server instance (such as a bootstrapping server instance and/or HLR/HSS) that has been used as part of a bootstrapping process.

The data communication may comprise security data, at least part of which relates to the shared secret. For example, the security data may be data that is passed from the bootstrapping server to a UE or M2M device as part of a bootstrapping process so that the shared secret may be derived by the UE or M2M device.

The security data may comprise an identifier of the shared secret (for example, a B-TID), wherein the pointer to the server instance is at least part of the identifier of the shared secret.

Where the entity is a network application function, NAF, the data communication may be part of a bootstrapping process for establishing a shared secret between a device (such as a UE or M2M device) and the bootstrapping server. The bootstrapping server may itself store the shared secret or data using which the shared secret may be derived, or the shared secret or data using which it may be derived may be stored in a different location that is accessible to the bootstrapping server, for example a database.

The pointer may be used to select a server instance from a plurality of server instances, for example a particular bootstrapping server instance from a cluster of server instances making up a bootstrapping server, or a particular HLR/HSS.

The data communication may comprise a request from the NAF to the bootstrapping sever for push information (for example, a GPI) for forwarding to the device as part of the bootstrapping process.

The data communication may be part of a process of establishing secure communication between a network application function, NAF, and a device, wherein secure communication is establishable using a shared secret that is shared between the device and the bootstrapping server. For example, the device and the NAF may be trying to establish secure communication using the shared secret as a key, or by deriving one or more new keys from the shared secret. Therefore, the NAF may be requesting the shared secret and/or a lifetime of the shared secret from the bootstrapping server in order to establish that secure communication.

The data communication may comprise an identifier of the shared secret (for example, a B-TID or P-TID) and/or an identifier of the device (for example, an MSISDN or IMPU) wherein the pointer to the server instance is at least part of the identifier of the shared secret and/or the identifier of the device.

Where the identified server instance comprises an instance of the bootstrapping server, the method may further comprise a step of routing an interface for communication between the NAF and the instance of the bootstrapping server using at least the pointer to the instance of the bootstrapping server.

Where the server instance comprises a home location register, HLR, or a home subscriber server, HSS, the method may further comprise a step of retrieving data (such as an authentication vector, or a CK and IK, or a Ks) from the HLR or HSS that is indicated by the pointer, wherein the shared secret is derivable at least in part using at least part of the retrieved data.

The pointer may be used to advise of which server instance has been selected from a plurality of server instances. For example, it may be set by the bootstrapping server to indicate which bootstrapping server instance and/or HLR/HSS has been used as part of a bootstrapping process.

The data communication may comprise push information for forwarding to the device as part of the bootstrapping process (for example, as part of a GBA-push process). The push information may comprise bootstrapping data (for example, a GPI) for use in the bootstrapping process, wherein the pointer to the security server instance is at least part of a data item in the bootstrapping data.

In a further aspect, there is provided a bootstrapping server (for example, a BSF) for use in a bootstrapping process for establishing a shared secret shared between a device and the bootstrapping server, the bootstrapping server being configured to: set, in at least part of data to be communicated to an entity, a pointer to a security server instance, wherein the security server instance has access to shared secret data; and output to the entity the data to be communicated to the entity, as part of the bootstrapping process.

The security server instance may be any server that has access to the shared secret data. For example, the security server may itself store the shared secret data, or the shared secret data may be stored at some other location (for example, a database) that the security server has access to. The shared secret data may comprise the shared secret itself (for example, a Ks_NAF), or it may comprise data using which the shared secret (Ks_NAF) may be derived (for example, it may comprise at least one of an authentication vector, or a K or Ki, or a CK and IK, or a Ks, or a RAND etc), or other data relating to the shared secret, such as the lifetime of the shared secret. For example, where the security server instance is a bootstrapping server, the shared secret data may comprise the shared secret (Ks_NAF) and/or the lifetime of the shared secret, and/or data using which the shared secret may be derived (for example, CK and IK; and/or RAND and/or Ks etc). Where the security server is some other server, for example an HLR or HSS, the shared secret data may comprise data from which the shared secret may be derived (for example K or Ki and/or Ks and/or CK and IK).

The bootstrapping process may be based on any suitable bootstrapping architecture or protocol. For example, it may be based on Generic Bootstrapping Architecture, GBA, or a GBA-like architecture, or a device management, DM, bootstrapping protocol etc. The GBA used may be any flavour or variant of GBA, for example GBA-U, 2G-GBA, GBA push etc.

By setting the pointer, the bootstrapping server is able to indicate the server instance that has access to shared secret data (for example, because it is the server instance that took part in a bootstrapping process) so that that server instance may be contacted at a later time (for example, by the device or a server such as a NAF, as part of a process for establishing secure communication) to obtain the shared secret or information relating to the shared secret (such as a lifetime of the shared secret).

The entity may be the device, for example a Machine-to-Machine, M2M, device, or a user equipment device, UE.

The data to be communicated to the device may comprise security data, at least part of which relates to the shared secret. The security data may comprise an identifier of the shared secret (for example, a B-TID), wherein the pointer to the security server instance is at least part of the identifier of the shared secret.

Alternatively, the entity may be a network application function, NAF. The data to be communicated to the NAF may comprise push information for forwarding to the device as part of the bootstrapping process, for example as part of a GBA-push process. The push information may comprise bootstrapping data for use in the bootstrapping process, wherein the pointer to the security server instance is at least part of a data item in the bootstrapping data. The bootstrapping data may comprise data using which the shared secret may be derived (for example, by an M2M device or a UE, or by the NAF).

The security server instance may comprise an instance of the bootstrapping server, for example the instance that has taken part in a bootstrapping process or the instance that is to be used in a bootstrapping process. In this case, the shared secret data may comprise the shared secret itself, or data from which the shared secret may be derived (for example, CK and IK, and/or Ks and/or RAND etc), and/or a lifetime of the shared secret.

A communications interface (for example, Zn or Zpn) between the instance of the bootstrapping server and the NAF is routable using the pointer to the instance of the bootstrapping server.

The security server instance may additionally or alternatively comprise a home location register, HLR, or a home subscriber service, HSS, for example the HLR/HSS that has taken part in a bootstrapping process, or the instance that is to be used in a bootstrapping process. In this case, the shared secret data may comprise data from which the shared secret may be derived, for example an authentication vector, and/or K or Ki (which are keys shared between a card on the device and the HLR/HSS), and/or CK and IK, and/or Ks, and/or RAND etc.

The bootstrapping server may be further configured to receive a request for the shared secret and/or a lifetime of the shared secret, wherein the request comprises the pointer to the security server instance; identify, using the pointer, the HLR or HSS that has access to the shared secret data; and retrieve data from the HLR or HSS using the pointer, wherein the shared secret and/or lifetime of the shared secret is derivable at least in part using at least part of the retrieved data (for example, the retrieved data may comprise at least one of an authentication vector; or Ks; or CK and IK; or RAND etc). In this way, the bootstrapping server may be able straightforwardly to identify and contact the HLR/HSS that holds the shared secret data for the device and obtain the data that the bootstrapping server requires in order to derive the shared secret and/or lifetime of the shared secret. In a further aspect, there is provided a bootstrapping server for use in establishing secure communication between a network application function, NAF, and a device (for example, a UE or M2M device), the bootstrapping server being configured to: receive a request for a shared secret and/or a life time of the shared secret, wherein the shared secret is derivable from a key (for example, K or Ki) shared between the device and a security server instance, wherein the request comprises a pointer to the security server instance; retrieve, using the pointer, data for derivation of the shared secret (for example, at least one of an authentication vector; or CK and IK; or Ks; or RAND etc) and/or the lifetime of the shared secret from the security server instance; and output the shared secret and/or the lifetime of the shared secret in response to the request.

The bootstrapping process may be based on any suitable bootstrapping architecture or protocol. For example, it may be based on Generic Bootstrapping Architecture, GBA, or a GBA-like architecture, or a device management, DM, bootstrapping protocol etc. The GBA used may be any flavour or variant of GBA, for example GBA-U, 2G-GBA, GBA push etc.

In this way, a NAF may send a request to a bootstrapping server for a shared secret or lifetime of a shared secret in respect of a particular device and the bootstrapping server will be able to identify the server instance that holds the relevant information for that device.

Thus, the bootstrapping server is able more straightforwardly to obtain the information it requires to meet the request of the NAF.

In an alternative, rather than returning the shared secret and/or lifetime of the shared secret, the bootstrapping server may return data using which the NAF, or any other apparatus, may derive the shared secret and/or lifetime of the shared secret.

The request may comprise an identifier of the shared secret (for example, a B-TID or P-TID) and/or an identifier of the device (for example, an IMPU, MSISDN, or any other means of identifying the device), wherein the pointer is at least part of the identifier of the shared secret and/or the identifier of the device.

The security server instance may be any server that may hold the key. For example, the security server instance may comprise a home location register, HLR, or a home subscriber server, HSS.

In a further aspect, there is provided a device (for example, a machine-to-machine, M2M, device, or a user equipment device, UE) for communication with a network application function, NAF, wherein the communication between the device and the NAF is securable using a shared secret shared between the device and a bootstrapping server, the device being configured to: exchange data with a bootstrapping server as part of a process for bootstrapping the shared secret to the device, wherein the exchanged data comprises a pointer to a security server instance, wherein the security server instance has access to shared secret data; and output the pointer for provision to the NAF.

The bootstrapping process may be based on any suitable bootstrapping architecture or protocol. For example, it may be based on Generic Bootstrapping Architecture, GBA, or a GBA-like architecture, or a device management, DM, bootstrapping protocol etc. The GBA used may be any flavour or variant of GBA, for example GBA-U, 2G-GBA, GBA push etc.

The exchange of data comprising the pointer may be from the device to the bootstrapping server (for example a request to start a bootstrapping process, such as a GET request), or it may be from the bootstrapping server to the device (for example, providing data using which the shared secret may be derived by the device).

The security server instance may have access to the shared secret data by storing the data itself, or having access to an apparatus (for example, a database) that stores the data.

The shared secret data may comprise the shared secret itself (for example, a Ks_NAF), or it may comprise data using which the shared secret (Ks_NAF) may be derived (for example, it may comprise at least one of a K or Ki, or a CK and IK, or a Ks, or a RAND), or other data relating to the shared secret, such as the lifetime of the shared secret. For example, where the security server instance is a bootstrapping server, the shared secret data may comprise the shared secret (Ks_NAF) and/or the lifetime of the shared secret, and/or data using which the shared secret may be derived (for example, CK and IK; and/or RAND and/or Ks etc). Where the security server is some other server, for example an HLR or HSS, the shared secret data may comprise data from which the shared secret may be derived (for example, an authentication vector, and/or K or Ki and/or Ks and/or CK and IK and/or RAND etc).

By outputting the pointer for provision to the NAF, the NAF can obtain the pointer and include it in any communications that it may have with the bootstrapping server, such that NAF may at a later time obtain the shared secret or data relating to the shared secret (for example, a lifetime of the shared secret, or data from which the shared secret is derivable) from the security server instance.

The exchanged data may comprise an identifier of the shared secret (for example, a B-TID) and/or an identifier of the device (for example, an IMSI, IMPI, TMPI, TMSI, or any other means of identifying the device), wherein the pointer is at least part of the identifier of the shared secret and/or the identifier of the device.

The pointer may be output for provision to the NAF by outputting the identifier of the shared secret and/or the identifier of the device. For example, the identifier of the shared secret and/or the identifier of the device, which comprise the pointer, may be passed to the NAF via an interface (such as Ua), either as part of a bootstrapping process, or at any suitable time.

The device may be configured to extract the pointer from the data before outputting the pointer for provision to the NAF. Thus, the pointer may be output to the NAF either on its own or as part of any other data.

In a further aspect, there is provided a network application function, NAF, for use in a bootstrapping process for establishing a shared secret shared between a device and a security server instance, wherein the NAF is configured to: set an identifier of the shared secret (for example, a P-TID), wherein the identifier is set to a value to point to a bootstrapping server instance; and output a request for push information (for example, GPI) for forwarding to the device as part of a bootstrapping process, wherein the request comprises the identifier of the shared secret and is routable to the bootstrapping server instance using the identifier of the shared secret.

The bootstrapping process may be, for example, based on a GBA-push architecture, or any other suitable bootstrapping architecture or protocol.

In this way, a particular bootstrapping server instance may be used for the bootstrapping process. Thus, load balancing between bootstrapping server instances may be achieved.

The NAF may be further configured to output a request for the shared secret and/or a life time of the shared secret, wherein the request comprises the identifier of the shared secret and is routable to the bootstrapping server instance using the identifier of the shared secret. For example, the request may be part of a process of establishing secure communication with a device, such as an M2M device or UE, using the shared secret (either directly as a key, or to derive new keys for securing the communication).

In a further aspect, there is provided a network application function, NAF, for communication with a device, wherein the communication is securable using a shared secret that is shared between the device and a bootstrapping server, wherein the NAF is configured to receive data from an entity, wherein the data comprises a pointer to a security server instance, wherein the security server instance has access to shared secret data.

The security server instance may have access to the shared secret data by storing the data itself, or having access to an apparatus (for example, a database) that stores the data.

The shared secret data may comprise the shared secret itself (for example, a Ks_NAF), or it may comprise data using which the shared secret (Ks_NAF) may be derived (for example, it may comprise at least one of a K or Ki, or a CK and IK, or a Ks, or a RAND etc), or other data relating to the shared secret, such as the lifetime of the shared secret. For example, where the security server instance is a bootstrapping server, the shared secret data may comprise the shared secret (Ks_NAF) and/or the lifetime of the shared secret, and/or data using which the shared secret may be derived (for example, CK and IK; and/or RAND and/or Ks etc). Where the security server is some other server, for example an HLR or HSS, the shared secret data may comprise data from which the shared secret may be derived (for example an authentication vector, and/or K or Ki and/or Ks and/or CK and IK and/or RAND etc).

Thus, the NAF can obtain a pointer to the security server instance from which shared secret data may be obtained, for example when securing communications with the device.

The NAF may be further configured to: extract the pointer from the data; and store the pointer with an association to the device. The pointer may, for example, be stored as part of a security association that the NAF has for the device, or in any other way that links the device to the pointer. Thus, the NAF will be able to identify the correct pointer corresponding to a device with which it is communicating, such that the corresponding shared secret may more straightforwardly be retrieved from the server instance.

The NAF may be further configured to output a request to a bootstrapping server for the shared secret and/or a life time of the shared secret, wherein the request comprises the pointer to the security server instance. For example, the request may be part of a process of securing communications with the device using the shared secret (either directly as a key, or by deriving a new key(s) from the shared secret).

The security server instance may comprise an instance of the bootstrapping server, wherein the request to the bootstrapping server is routed to the instance of the bootstrapping server using the pointer.

The entity may be the device (for example, the M2M device or UE), or the entity may be the bootstrapping server, wherein the received data communication from the bootstrapping server comprises push information for forwarding to the device as part of the bootstrapping process.

In a further aspect, there is provided a system comprising any one of the bootstrapping servers identified above and the machine-to-machine, M2M, device identified above.

The system may further comprise any one of the network application functions, NAFs, identified above.

In a further aspect, there is provided a system comprising any one of the bootstrapping servers identified above and any one of the network application functions, NAFs, identified above.

In a further aspect, there is provided a system comprising the machine-to-machine, M2M, device identified above and any one of the network application functions, NAFs, identified above.

The methods may be based on a Generic Authentication Architecture, GAA, in particular on a Generic Bootstrapping Architecture (GBA).

The connection between the M2M device and the NAF may utilise the CoAP protocol or the LWM2M protocol or any other suitable protocol.

The present disclosure also provides a network application function, NAF, comprising logic configured to perform the above disclosed method.

The NAF may be any server or network component that terminates secure communication on an interface between the NAF and the M2M device.

The NAF may be configured as a proxy to sit between the M2M device and a device management server (DM server) and/or as a proxy to sit between the M2M device and a LWM2M server and/or as a proxy to sit between the M2M device and a LWM2M bootstrapping server and/or as a proxy to sit between the M2M device and a bootstrapping server.

The NAF may additionally, or alternatively, be configured as a router to sit between the M2M device and the DM server and/or as a router to sit between the M2M device and a LWM2M server and/or as a router to sit between the M2M device and a LWM2M bootstrapping server and/or as a router to sit between the M2M device and a bootstrapping server. In this way, the NAF may pass any suitable traffic on to the DM server/LWM2M server/LWM2M bootstrapping server/bootstrapping server either encrypted or unencrypted such that the functionality of the server/LWM2M server/LWM2M bootstrapping server/bootstrapping server need not be modified in any way and the server/LWM2M server/LWM2M bootstrapping server/bootstrapping server does not need to be 'GBA aware'.

The present disclosure also provides a device management server (DM server) comprising the NAF of the present disclosure. For example, the NAF may be a plug-in component in the DM server, or the NAF may be the DM server itself (i.e. the NAF is identical to the DM server). The present disclosure also provides a LWM2M server comprising the NAF of the present disclosure. For example, the NAF may be a plug-in component in the LWM2M server, or the NAF may be the LWM2M server itself (i.e. the NAF is identical to the LWM2M server). The present disclosure also provides a LWM2M bootstrapping server comprising the NAF of the present disclosure. For example, the NAF may be a plug-in component in the LWM2M bootstrapping server, or the NAF may be the LWM2M bootstrapping server itself (i.e. the NAF is identical to the LWM2M bootstrapping server). The present disclosure also provides a bootstrapping server comprising the NAF of the present disclosure. For example, the NAF may be a plug-in component in the bootstrapping server, or the NAF may be the bootstrapping server itself (i.e. the NAF is identical to the bootstrapping server).

The present disclosure also provides a system comprising the above disclosed M2M device and NAF.

The methods described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operation system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
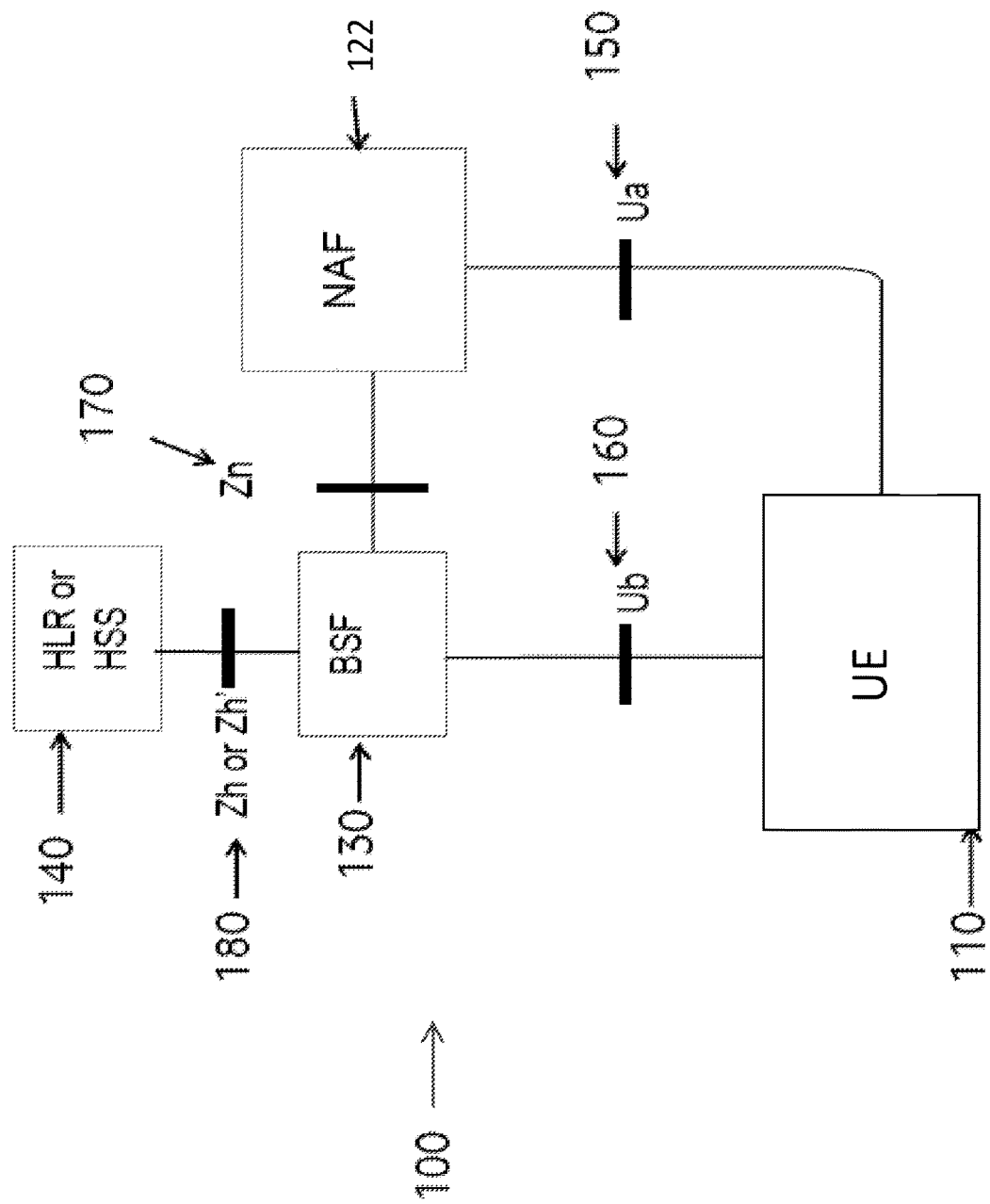
FIG. 1 shows a schematic diagram of components and interfaces with which GBA may be used.

A device may communicate securely with a server. The device may be a Machine to Machine (M2M) device, or an equivalent device (e.g. a device, a generic or specific communication device, including one or more modules capable of providing M2M capabilities).

Aspects of the Generic Authentication Architecture (GAA) and Generic Bootstrapping Architecture (GBA) are identified in "Details of 3GPP standards and technologies used to implement aspects of the method and system" above. In particular, the specific architecture on which the method and system may be based is GBA.

Generic Bootstrapping Architecture (GBA) uses existing security associations between a network (e.g. a mobile network) and a card (e.g. a SIM card or UICC) to derive a key that can be used for the secure communication between the client and the server. Accordingly, if the device is associated with such a card, as well as with the client, the method can advantageously use the GBA to derive the security elements (e.g. a shared secret) to enable the client associated with the device to securely communicate with the server. Accordingly, the device could be advantageously adapted so that it is associated with the card and the client and uses GBA to derive the security elements for secure communication with the server. Moreover, as GBA is standards-based, the impact of the required modifications may be relatively limited and the overall solution would be very attractive (in particular, to M2M users/owners as well as to network operators and/or service providers).

M2M devices are different from the mobile devices that OMA Device Management was originally designed for (such as mobile phones, laptops, computers, as explained in "Details of 3GPP standards and technologies used to implement aspects of the method and system" above), and use of GBA (in any of its versions) with M2M is not a straightforward implementation.

A variant of GBA, called "GBA Push" has been proposed for securing a message between a client and a DM server in the context of OMA Device Management Security, and is identified in "Details of 3GPP standards and technologies used to implement aspects of the method and system" above. It is noted that, although GBA Push and GBA are related, it is not trivial to use GBA in place of GBA Push (and vice versa). This is because these two architectures have some important differences. First, in GBA the device has to contact the BSF in order to request a RAND and AUTN (and use this to derive a Ksjocal). To the contrary, in GBA Push, the client does not have to talk to the BSF—it just receives a message prepared by the BSF. Furthermore, in GBA, there is no need to modify the Ua interface. In GBA Push, either the Ua interface has to be modified in some way to carry the push message or a new interface must be added. Accordingly, GBA Push cannot be used with an arbitrary application protocol. For GBA Push, the application protocol has to be "GBA aware" in some sense (e.g. so it can carry the GBA Push Info (GPI) messages). In GBA, the Ksjocal can be used to derive several different Ks_NAFs (e.g. for different application servers). In GBA Push, only one NAF can use/rely on the Ksjocal.

Accordingly, GBA Push is slightly less efficient than GBA.

The GBA Push Info is described in 3GPP TS 33.223, Section 5.2.1. The encoding is defined in Section 5.3.5. See in particular table 5.2.1.1 and figure 5.3.5.1 in 3GPP TS 33.223 V12.0.0 (201 3-1 2) that may be found:
http://www.3gpp.org/ftp/Specs/archive/33_series/33.223/33223-c00.zip Moreover, as discussed above, M2M devices are very constrained in their capabilities (e.g. computation, communication, life, etc.) and these constraints make their management more complex and harder to implement in a simple manner. GBA requires a number of interfaces and components which are hard to implement with M2M (for examples and description of these interfaces and components, please refer to the sections below).

In order to more efficiently and securely manage the device and/or services provided by (or via) the device, these interfaces and components need to be modified or otherwise adapted so they can properly and effectively work with M2M devices.

For example, carrying the Ub interface (and associated protocol) over constrained M2M devices is very difficult. For example, the standard Ub interface uses HTTP and HTTP digest. The likely rationale for this is that, as mentioned above, GBA was designed having mobile devices, such as mobile phones, in mind. So, since all phones use HTTP, and therefore all have an HTTP stack, then HTTP was the easiest protocol to be used for the Ub interface. However, this is not true for M2M devices. For example, according to the Lightweight M2M (LWM2M) protocol (see below for more details), a protocol called CoAP is used in M2M devices, precisely because it is a simpler/more efficient alternative to HTTP. Alternatively, this Ub interface could be tunnelled, for example via another interface (e.g. the Ua), so that the system may be simplified.

Additionally, building all the necessary components (e.g. GAA server, interfaces) into a capacity-constrained M2M device appears to be very difficult. For example, physical and virtual space constraints, as well as computational constraints, create considerable problems for building the necessary components. Moreover, having one or more interfaces between M2M application(s) and a card on the device, such as a UICC, is very difficult. This is due, for example, to the fact that most M2M modems do not support the required low level interface(s). In general, the overall integration of the GBA required interfaces and components with an M2M device appear very difficult. A possible, but not optimal solution, could be to pre-provision the M2M devices (e.g. having the M2M devices already designed and/or manufactured with the required components and interfaces) and the associated elements required for use of GBA (e.g. the card being capable of interfacing with the M2M device) so that the GBA could be used. To date, no M2M device is pre-provisioned with these characteristics.

In addition, as noted above, GBA is not widely used. There are other reasons why GBA is not widely used. For example, use of GBA requires support in the device, in the network (e.g. BSF—see below) and by individual services (which may be deployed, for example, by a mobile operator or by other parties). In the preferred use-case (mobile broadcast) support is also required in the SIM card (as it uses GBA-U). Accordingly, a lack of coordination and willingness to act/cooperate between the various parties involved in this deployment (e.g. device manufacturers, mobile operators, service providers) has so far blocked implementation of GBA.

For all the above reasons, GBA (or a GBA-like architecture, for example a variant and/or a suitably modified version) may be used for enabling a secure communication with a device (in particular, an M2M device). The communication may be between a server and a client, the client being associated with the device, and wherein this communication may be done for managing the device and/or services provided by (or via) the device. This enables a secure management of that device and/or the services provided by (or via) the device and creates a new and innovative combination which produces a synergistic effect and provides many technical advantages.

For instance, as already mentioned above, the GBA will provide a higher and very strong level of security to the device/service management-related communications with M2M devices, which is a very critical and important point.

Another advantage, in addition or combined with the strong security described above, is in terms of full automation. Moreover, an M2M service provider does not have the cost/complexity of setting up their own security solutions, as the solution can be provided directly by the mobile operator implementing the solution described in this application. In particular, a service provider does not have to set up a PKI, issue certificates, pre-load keys to devices and so on.

Accordingly, the method may further comprise that the provision of the secure communication is based on a security association between a network and a card, the card being associated with the device. For example, the card may be embedded within the device (e.g. soldered in the device) or provided to the device by way of a suitable connection. In general, the card may be associated in any suitable manner so that there is an association between the card and the device. The network can be a mobile network, or any equivalent network, while the card can be a SIM card, a UICC, or any card associated with the network. The method may further comprise deriving a shared secret based on the security association. The method may further comprise providing the client and the server with the shared secret so as to enable the secure communication. The server may be a server adapted to manage the device (e.g. remotely manage the device, send updates, transfer information to and from the device, control device parameters, etc.) and to manage services provided by the device (e.g. device is used to switch on/off and/or dim streetlights). The shared secret may be a key and/or a similar security arrangement.

The method may further comprise authentication between the client and the server. The authentication may be based on the shared secret. The authentication may be performed via an authentication component. The authentication may be performed by means of a first authentication between the client and an authentication component and of a second authentication between the server and the authentication component. The client and the server may be independently authenticated by an authentication component. As a result of the client and the server being authenticated by the authentication component, both the client and the server may share the shared secret. The authentication may be performed by means of the shared secret. The shared secret may be shared between the client and the server. Alternatively, the shared secret may be shared between the client, the server and the authentication component. The authentication may implicitly result from the client, the server and the authentication component sharing the shared secret. The method may further comprise deriving a second shared secret based on the shared secret, the second shared secret being shared between the client and the server. This second shared secret may then be used for the authentication as discussed above.

The obtainment of the shared secret at the client may be based on an identifier associated with a server authentication component. The shared secret may be obtained at the server from the authentication component. The obtainment of the shared secret at the server is obtained based on an identifier associated with the shared secret. The identifier is generated by the authentication component. The identifier may be provided to the server by the client.

The OMA LWM2M protocol for managing (as well as interacting with) M2M devices and managing services provided by M2M devices (as described in "Details of 3GPP standards and technologies used to implement aspects of the method and system") may be used. However, other device management protocols may be used or the method and system may be extended to other M2M services (for example, securing the delivery of binary SMS).

GBA could be advantageously used in conjunction with LWM2M in order, for example, to establish keys for LWM2M, whilst at the same time LWM2M and the procedures specified therein could be used to transport and/or carry any message and/or communication which relates to GBA. For example, this can be done by using specific tunnels (e.g. Ub) or GBA Push Info (GPI) messages. The use of GBA together with LWM2M creates a new and innovative combination which produces a synergistic effect and provides many technical advantages. For example, it allows addressing many more low-end devices, such as M2M devices. This is due, for example, to the use of a device management protocol which is properly optimized for M2M, rather than one repurposed from the consumer space (e.g. OMA DM v1, TR-069). This optimised protocol can be used to transport GBA messages—avoiding the need for a separate HTTP stack—and to manage GBA parameters (identifiers for device and application, lifetimes, key derivation methods, etc.). Further, when accompanied by appropriate network systems to provide automated routing and discovery (e.g. of LWM2M server and BSF), GBA and LWM2M advantageously combine to eliminate the cost of preloading settings and credentials, so facilitating low cost devices. GBA with LWM2M securely supports low-cost devices which are unattended or have no UI, where there is no option for user interaction (such as entry of PIN), and where there is no user who is able to notice and recover from authentication failures (spoof server, spoof client or Man In The Middle), Moreover, GBA works without requiring any public key or certificate processing on the device. This is particularly advantageous on simpler devices, as these devices may have minimal public key support or implementation errors when handling certificates.

Accordingly, the shared secret may be used as a key in the LWM2M standard. Also, the LWM2M standard procedures may be used for transmission and/or reception of any communication used within the GBA.

The shared secret may be used as a key or shared secret within the DTLS protocol (identified in "Details of 3GPP standards and technologies used to implement aspects of the method and system" above), either when the LWM2M is used in conjunction with a DTLS protocol or when the DTLS is used alone or in conjunction with one or more other protocols.

The secure communication may further be a data communication. The data communication may be an SMS-based communication. An SMS binding may be used. The data communication may be a UDP-based communication.

The method may further comprise encrypting a communication over the secure data communication. The encryption may be performed using an Advanced Encryption Standard. The SMS-based communication may be further secured by use of an Over-The-Air (OTA) protocol, e.g. a Secured Packet Structure for UICC Applications. This protocol is defined in ETSI standard 1 02.225. The OTA protocol may be arranged to secure the communication with the identification card associated with the device.

It has also been noted that the OTA protocol can be used advantageously in conjunction with the LWM2M standard, in which the LWM2M can be used to manage parameters, keys and similar elements for the OTA protocol.

The use of OTA with LWM2M is not a straightforward implementation. OTA is a solution designed for SIM card security, as it has some real technical challenges if used for LWM2M. In particular, while there is software written for SIM cards and SIM OTA servers to support ETSI standard 102.225, a similar software does not exist in the device management space for devices (and, in particular, not for OMA DM clients and servers). Thus, M2M device manufacturers do not have a code-base that they can easily adapt for use with these devices.

Further, the ETSI standard 102.225 does not explain how to set up the keys and parameters for use with the standard. It simply assumes the keys and parameters are all pre-loaded and known to both SIM card and OTA server. Although this assumption is acceptable in the SIM space—because SIM cards can be securely provisioned with the necessary keys at the manufacturing stage, and SIM manufacturers have interfaces with operators for communicating the necessary keys and parameters—the same cannot be said about LWM2M, where that infrastructure does not exist.

Thus, the use of OTA together with LWM2M creates a new and innovative combination which produces a synergistic effect and provides many technical advantages. For example, the SMS bearer needs to be secured, and so far no solution has been found. Use of OTA enables the SMS bearer to be used in LWM2M. Without it, it would not be possible to use SMS-based communications in LWM2M, and that would limit the applicability of the overall LWM2M standard.

Accordingly, the LWM2M standard procedures may be used to manage parameters and/or keys used in the OTA protocol. The method may further be used in conjunction with LWM2M, as described above.

It has also been noted that the method described above, implemented using the GBA (or a similar architecture), can be used in conjunction with SMS so that the GBA can be employed to establish keys for secure SMS-based communications (e.g. SMS), while at the same time SMS-based communications can be used to transport or carry messages associated with GBA—for example, carry GBA Push Info (GPI) messages. The use of SMS-based communications together with GBA creates a new and innovative combination which produces a synergistic effect and provides many technical advantages. For example, GBA can be used to establish the shared keys that are needed to protect SMS, while using SMS as a transport to deliver the necessary GBA messages. Further the SMS used to deliver the GBA messages can themselves be integrity protected (and partly encrypted) using the keys that will be established by GBA, so at no point is there a reliance on not secure SMS. This synergistic combination allow use of SMS as the sole bearer for M2M traffic, something which would not otherwise be possible, except by preloading the keys needed to secure SMS traffic, or switching to a different protocol to negotiate these keys: both of these alternatives would add complexity and cost. Thus, it would provide a very high security solution for obtaining shared keys so that the security of the keys is not compromised, and at the same time an-SMS-based communication is enabled by virtue of the provisioning of the keys.

Accordingly, when the method is implemented using GBA, the GBA may be used to establish keys for secure transmission and/or delivery of SMS. SMS-based communications may be used for transmission and/or reception of any communication used within the GBA, noting that these communications may themselves be protected using the keys that will be derived in GBA.

In addition to the above, the server may further comprise a server authentication component. Also, the client may further comprise a client authentication component. The server authentication component may perform authentication of the server with the authentication component. The client authentication component may perform authentication of the client with the authentication component.

Further, the authentication component may be a Bootstrapping Server Function (BSF), the server authentication component may be a Network Application Function (NAF) and the client authentication component may be a GAA Server.

The method may further comprise communicating between the server and the client for determining security parameters to be used for the secure communication, wherein the communicating is performed by using a device management protocol (for example, the GBA). The secure communication may be for use in the device management protocol.

In a further embodiment, there is provided a method of enabling secure communication for use in a device and/or service/application management protocol, the secure communication being between a server and a client, the client being associated with a device, the secure communication requiring security parameters to be agreed between the client and server, the method comprising communicating between the server and client to agree the security parameters, wherein the communicating is performed by using the device management protocol. The device can be an M2M device.

In a further embodiment, there is provided an apparatus, system, module or network for enabling secure communication with a device, said communication being between a server and a client, the client being associated with the device. In addition, the apparatus, system, module or network may further include means for performing any one of the steps or features of the methods described above. The device can be an M2M device.

In a further embodiment, there is provided an apparatus, system, module or network for enabling secure communication for use in a device and/or service/application management protocol, the secure communication being between a server and a client, the client being associated with a device, the secure communication requiring security parameters to be agreed between the client and server, the method comprising communicating between the server and client to agree the security parameters, wherein the communicating is performed by using the device management protocol. In addition, the apparatus, system, module or network may further include means for performing any one of the steps or features of the methods described above. The device can be an M2M device.

In a further embodiment, there is provided a client including any means, features or functionalities corresponding to the means, features or functionalities relative to the client as recited by any one of the methods described above.

In a further embodiment, there is provided a server including any means, features or functionalities corresponding to the means, features or functionalities relative to the server as recited by any one of the methods described above.

In a further embodiment, there is provided a device comprising a card and a client, wherein the device is arranged for enablement of secure communication, the secure communication being between a server and the client, wherein the provision of the secure communication is based on a security association between a network and the card. The client may comprise any means, features or functionalities corresponding to the means, features or functionalities relative to the client as recited by any one of the methods described above. The device can be an M2M device.

In a further embodiment, there is provided a server arranged for enablement of secure communication with a device, the secure communication being between the server and a client associated with the device, wherein the provision of the secure communication is based on a security association between a network and a card, the card being associated with the device. The server may comprise any means, features or functionalities corresponding to the means, features or functionalities relative to the server as recited by any one of the methods described above. The device can be an M2M device. In a further embodiment, there is provided a system for enabling secure communication with a device, said communication being between a server and a client, the client being associated with the device, wherein the provision of the secure communication is based on a security association between a network and a card, the card being associated with the device. The device can be an M2M device.

In a further embodiment, there is provided a method of enabling secure data communication with a device, the communication being between a server and a client associated with the device, wherein the security of the communication is enabled by a bootstrapped secret. The device can be an M2M device. The security protocol may be used to secure the data communication. The bootstrapped secret may be used to obtain the security elements used for the secure protocol. The bootstrapped secret may be a pre-shared secret, said secret being directly provided to the server and the client. The pre-shared secret may be permanently provided to the server and the client (e.g. by pre-provisioning the client and/or the server with said pre-shared secret, e.g. at manufacturing stage or before the client and/or server are used in a system). The pre-shared secret may be a strong, high entropy or a temporary, low-entropy pre-shared secret. The bootstrapped secret may be based on a public key or a certificate-based method. The bootstrapped secret may be provided via a bootstrap server. The security elements can be keys and/or similar arrangements well known in the art.

The communication may be an SMS-based communication. The security protocol is defined by ETSI TS 1 02.225. The method may use SMS binding. The device may be further associated with a card, and the security of the data communication may be controlled by means of the card. Any incoming SMS-based communication may be decrypted and/or checked by means of the card, and/or any outgoing SMS-based communication may be encrypted and/or checked by means of the card.

The communication may be a UDP-based communication. The security protocol may be a DTLS protocol.

The secure data communication may be provided over a communication interface. The communication interface may be used for managing the device of for managing the bootstrapping operations.

The data communication may be performed according to the LWM2M protocol.

In a further embodiment, there is provided an apparatus, system, module or network for enabling secure data communication with a device, the communication being between a server and a client associated with the device, wherein the security of the communication is enabled by a bootstrapped secret. The device can be an M2M device.

In a further embodiment, there is provided a method of retrieving security elements required for enabling secure data communication with a device, the communication being between a server and a client associated with the device, wherein the security elements are retrieved using a bootstrapping protocol. The device can be an M2M device. The bootstrapping protocol may retrieve the security elements in a secure session. The session may be secured based on a security protocol. The security protocol may be a DTLS protocol. The bootstrapping protocol may be based on GBA.

The data communication may be an SMS-based communication. The bootstrapping protocol may be a LWM2M bootstrap protocol. The security elements can be keys and/or similar arrangements well known in the art.

In a further embodiment, there is provided an apparatus, system, module or network for enabling secure data communication with a device, the communication being between a server and a client associated with the device, wherein the security elements are retrieved using a bootstrapping protocol. The device can be an M2M device.

The secure communication may be for the purpose of managing the device and/or the client and/or services (e.g. provided by the device) by the server. Both the device and the server may be machines (i.e. not requiring any human intervention to work). When the device is a machine, the server may be used to manage it. Again, the management may be done without any human intervention (e.g. automatically).

As discussed above, the solution could be used in conjunction with the LWM2M protocol, but the solution could be extended to other Device Management protocols, or to other M2M services (e.g. securing delivery of binary SMS). In particular, and as discussed above, the use of the solution in conjunction with an M2M-specific protocol, such as LWM2M, allows the solution to be very efficient when used with M2M devices, and in particular, when used to manage the device and/or services provided by (or via) the device. In other words, all the advantages mentioned above are further enhanced and optimised when the solution is used in conjunction with an M2M-specific protocol.

In addition, there is also provided any aspects or combination of aspects according to any one of the claims.

Any combination of the features described in connection with any of the aspects is also provided, even if not explicitly disclosed.

Figure 2:
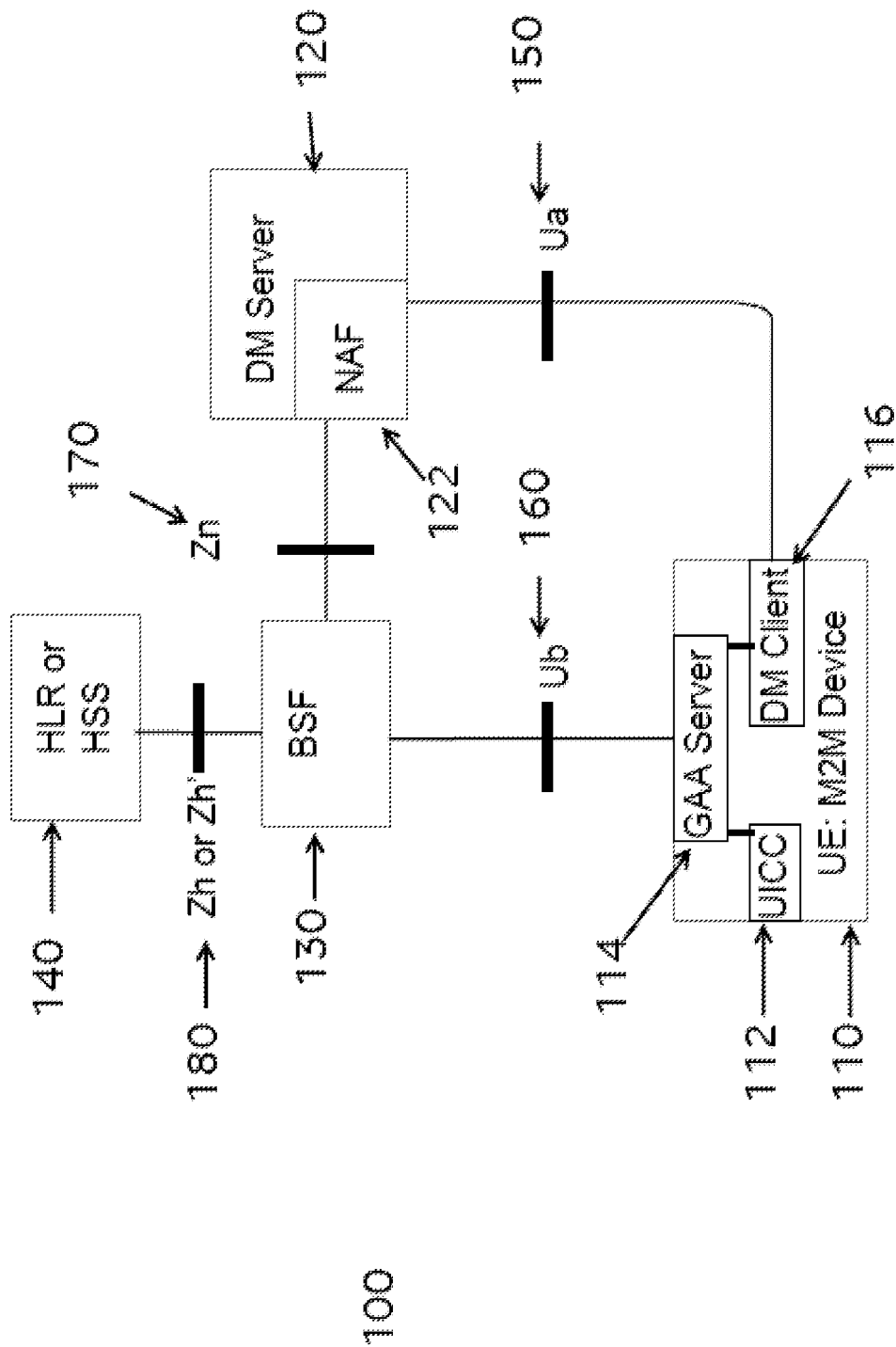
FIG. 2 shows a schematic diagram of an example of an architecture that can be used in accordance with the present invention, in particular when GBA is used.

With reference to FIG. 2, an exemplary architecture (1 00) is shown that may be implemented, in particular when GBA is used. A device 1 10 (in the example, an M2M Device and/or a User Equipment) is associated with a card 1 12 (in the example, a UICC) and a Client 1 1 6 (in the example, a Device Management (DM) client. Note that this client could also be an LWM2M Client, namely a client that can manage the device itself and service/applications provided by the device e.g. asset control). The device 1 10 is also associated with a device authentication component 1 14 (in the example, a GAA server). Further, a server 120 is provided (in the example, a DM server), the server associated with a server authentication component 1 22 (in the example, a Network Application Function (NAF)). Further, an authentication component 130 is provided (in the example, a Bootstrapping Server Function (BSF)) and a register 140 (in the example, an HLR or HSS). Also, four different interfaces are provided for communication between the various components, in particular interface Ua 1 50 between device 1 10 and server 1 20, interface Ub 1 60 between device 1 1 0 and authentication component 1 30, interface Zn 170 between authentication component 130 and server 1 20, and interface Zh/Zh' between authentication component 130 and register 140.

In particular, with reference to GBA, document TS 33.220 defines the following components and interfaces, which are shown on FIG. 2. NAF, the "Network Application Function", is a server-side component of an application that may be secured using GBA. In a preferred embodiment, the NAF may be a software component within a Device Management (DM) Server.

Some aspects of a BSF, HLR/HSS, UE, Ua, Ub, Zh/Zh' and Zn are provided in "Details of 3GPP standards and technologies used to implement aspects of the method and system" above.

On successful authentication of the device 1 10, the BSF 130 derives the shared secret Ks_NAF, which is retrieved by the NAF. In a preferred embodiment, the BSF 1 30 would most likely be on a separate server from the HLR/HSS 140, but within an M2M platform cluster.

The HLR/HSS may be "GBA-aware" (so that it stores details for a GBA user subscription) or may be a legacy component. In a preferred embodiment, the HLR/HSS would be the HLR or HSS of an M2M mobile operator (i.e. one dedicated specifically to serving M2M connections).

The UE 1 10 is, in the proposed solution, an M2M device.

In a preferred embodiment, the Ua is the interface between a Device Management client 1 1 6 and Device Management server 120.

In a preferred embodiment, the Ub would be the interface between the "GAA Server" component 1 14 of the device and the BSF 1 30.

In a preferred embodiment, the Zn interface is used.

In the proposed solution, this interface is between the Device Management Server 120 and the BSF 130. The WS version of the interface would allow placement of a DM Server in multiple locations (not just in the M2M operator/platform cluster), and allow future NAFs in multiple locations.

Figure 3:
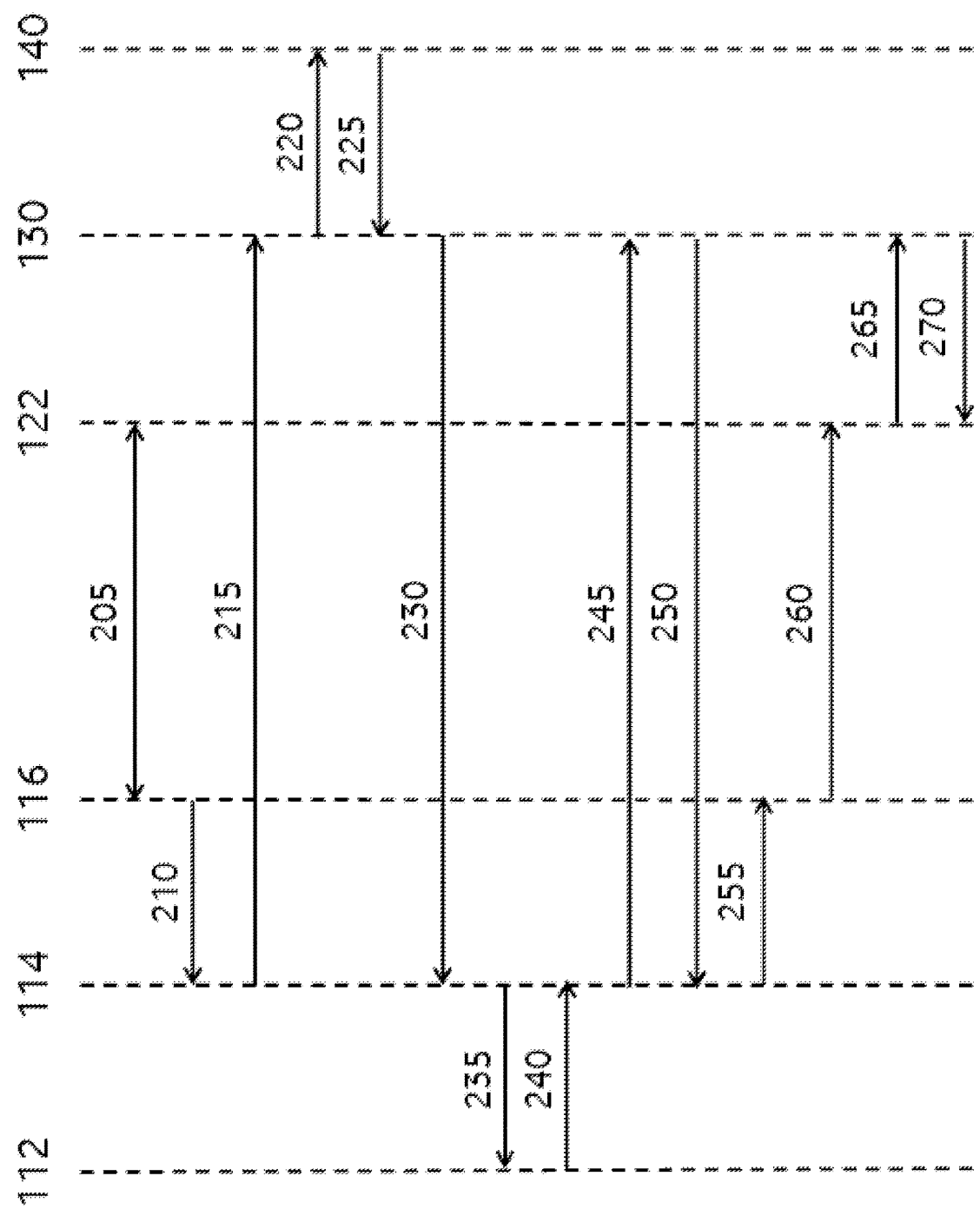
FIG. 3 shows an exemplary flow diagram of communications exchanged within the exemplary architecture of FIG. 2.

With reference to FIG. 3, the procedure for setting up the secure communication in accordance with the present invention is now described, in particular when GBA is used.

At 205, the UE 1 10 contacts over interface Ua the NAF 1 22 (in the described embodiment, the Device Management client 1 16 contacts the Device Management server 122) and discovers that the NAF requires it to acquire a shared secret using GBA. This could be because there is no existing secret, or the existing secret has expired, or is otherwise considered invalid by the NAF.

The exact interface and communication method may be specific to the application concerned. One possible interface and communication method for OMA Lightweight M2M is discussed below.

Over the internal UE interface from DM client to GAA server: at 210, the DM client 1 1 6 requests the GAA server 1 14 to obtain a shared secret. It presents an identifier for the corresponding NAF (NAFJd).

Over the Ub Interface: at 21 5, The UE 1 10 contacts the BSF (GAA Server 1 14 contacts the BSF 130). This may be a basic http GET request. The UE presents an "IMPI" (equivalent of an IMSI) or a "TMPI" (equivalent of a TMSI) for anonymity reasons, if one is available.

Over the Zh or Zh' Interface: at 220, the BSF 1 30 requests an authentication vector from the HLR/HSS 140. At 225, the HLR/HSS 140 returns a fresh vector, consisting of a RAND, AUTN, XRES, CK, and IK, for example.

The BSF 130 generates a transaction identifier (B-TID) and passes (230) the B-TID together with the RAND and AUTN back to the UE 1 10. It may also indicate the lifetime of the B-TID, and the associated key.

Over the internal UE interface from the GAA Server to the UICC: at 235, the GAA Server 1 14 forwards the RAND and AUTN to the UICC 1 1 2 which validates the AUTN. If the AUTN is valid, then the BSF 1 30 is authenticated. At 240, the UICC 1 12 returns a RES, CK and IK to the GAA Server 1 14.

At 245, the UE 1 10 (GAA Server 1 14) contacts the BSF 130 again, using the resulting RES for HTTP Digest authentication (which is identified in "Details of 3GPP standards and technologies used to implement aspects of the method and system" above).

The BSF 130 verifies the HTTP Digest using the XRES. If it matches, then the UE 1 1 0 has been successfully authenticated. The BSF 130 stores the tuple <IMPI, B-TID, RAND, CK, IK> and tells at 250 the UE 1 10 that the authentication was successful. The UE 1 1 0 stores <B-TID, RAND, CK, 1K>.

Over the internal UE 1 10 interface from DM client 1 16 to GAA server 1 14: the UE 1 1 0 (GAA Server 1 14) derives a secret Ks_NAF using the CK, IK, RAND, IMPI and NAFJd. At 255, it passes Ks_NAF and the B-TID back to the DM client 1 1 6.

Over the Ua interface again: at 260, the UE 1 10 (DM Client 1 16) contacts the NAF (DM Server 122) and presents the B-TID as retrieved above.

Over the Zn Interface: at 265, the NAF 122 contacts the BSF 1 30, and presents the BTID. The BSF 130 authenticates the NAF, derives the corresponding Ks_NAF, and at 270 returns it to the NAF, together with an indicator of key lifetime.

The UE 1 10 (DM Client 1 16) and NAF (DM Server 122) now both share Ks_NAF. They can use it directly, or to derive their own session keys for further communication.

Again, the exact interface and communication method may be specific to the application concerned. One possible interface and communication method for OMA Lightweight M2M is discussed below.

As discussed above, the solution could be used in conjunction with the LWM2M standard. This standard can be viewed as a successor to existing OMA Device management standards (OMA DM 1.0 to 1.3), but heavily optimized for low end machine-type devices, and with an extended management scope beyond the device itself including the management of services provided by the M2M device such as asset control. This contrasts for instance with OMA DM 2.0 which is the successor for consumer devices like smartphones, tablets etc. Other widely-used Device Management standards include TR-069, which was developed by the Broadband Forum for managing Customer Premises Equipment (in particular DSL modems).

The exemplary flow described with reference to FIG. 3 is very generic, and can be used with many different sorts of device management protocols (or other application protocols). As can be seen, many details of the Ua interface are outside the scope of 3GPP and are left to other standards to complete (or left to proprietary implementations). However, integration with the LWM2M standard is possible, as described in these examples.

Under the specification (see above), the security for OMA LWM2M is based on DTLS v1.2 (see above) and CoAP (see above). Both the client and server must support pre-shared key DTLS (e.g. see section 7.1.1, page 41), whereas support for certificate-based authentication is only optional. This means that a key derived by GBA (Ks_NAF) could be used as a DTLS pre-shared key and it would work with any DM client/DM server pair.

The general approach for pre-shared key TLS is referenced in "Details of 3GPP standards and technologies used to implement aspects of the method and system" above. The GBA and TLS-PSK protocols work well together. In 205 described above, the "Server Hello" message contains a field where the server can indicate that it supports GBA-bootstrapping, and in response, the client can then provide an identifier (B-TID) for an already bootstrapped key (260). Or if the client doesn't already have a bootstrapped key, it asks the GAA server to get one, before resuming the "Client Hello" and "Server Hello" at 260. The use of the Ks_NAF to derive session keys is then specified entirely within the TLS-PSK protocol. The 3GPP spec assumes HTTP/TLS, but the basic approach looks the same for CoAP/DTLS.

To improve consistency with the OMA profile of GBA, the LWM2M spec may need to define a "protocol identifier" for DTLS pre-shared key and have it registered by OMNA (see section 5.2.1 of OMA GBA Profile, Approved Version 1.1-31 Jul. 2012 found at ht[p://iechnicaLopenrriobiieailiance.org Technjcai/reiease program/sec cf archive.aspx).

Aside from GBA aspects, the M2M device may be configured to support the security of OMA LWM2M, which is referenced in "Details of 3GPP standards and technologies used to implement aspects of the method and system" above.

Additional Aspects

1. Device Development for GBA

As can be seen from FIG. 2 and FIG. 3, the M2M device may contain several internal components. It should support a DM client which is "GBA aware", as well as a "GAA Server" component.

The GAA Server component should support internal interfaces to the DM client and to the SIM card (UICC) as well the external Ub interface to the BSF. The interface to the UICC may be particularly challenging, as the M2M device may not expose an existing API to allow device software to send commands to the UICC. One possibility (that may be used) is for the modem to expose AT commands. However, this may not be at a sufficiently low level (AT+CSIM allows raw APDUs to be communicated to the UICC) in every case. Further, there may be security issues: while the GAA Server must be able to interface to the UICC, general applications installed on the device should not be able to use this interface, as that could allow external parties to impersonate the device (and engender fraud on the cellular network). So the API to the SIM Card should be privileged, as well as being sufficiently low level to be usable.

2. Ub Tunnelling, or GBA Push

The interface to the BSF is based on http and HTTP Digest authentication. One alternative may be "tunnelling" the Ub interface within the Ua interface, so that the device only needs to support the CoAP protocol (not HTTP as well). A related alternative is using the GBA "Push" variant, and carrying push messages (Upa interface) within the Ua interface. Both of these would require identifying suitable commands and parameters in the Ua interface (i.e. the relevant Device Management protocol) to carry the tunnel or push messages. The interfaces and message flow for GBA push are outlined below (see also 3GPP TS 33.223, entitled "3G Security; Generic Authentication Architecture (GAA); Generic Bootstrapping Architecture (GBA) Push function", it can currently be retrieved by http://www.3gpp.org/ftp/Specs/html-info/33223.htm).

Figure 4:
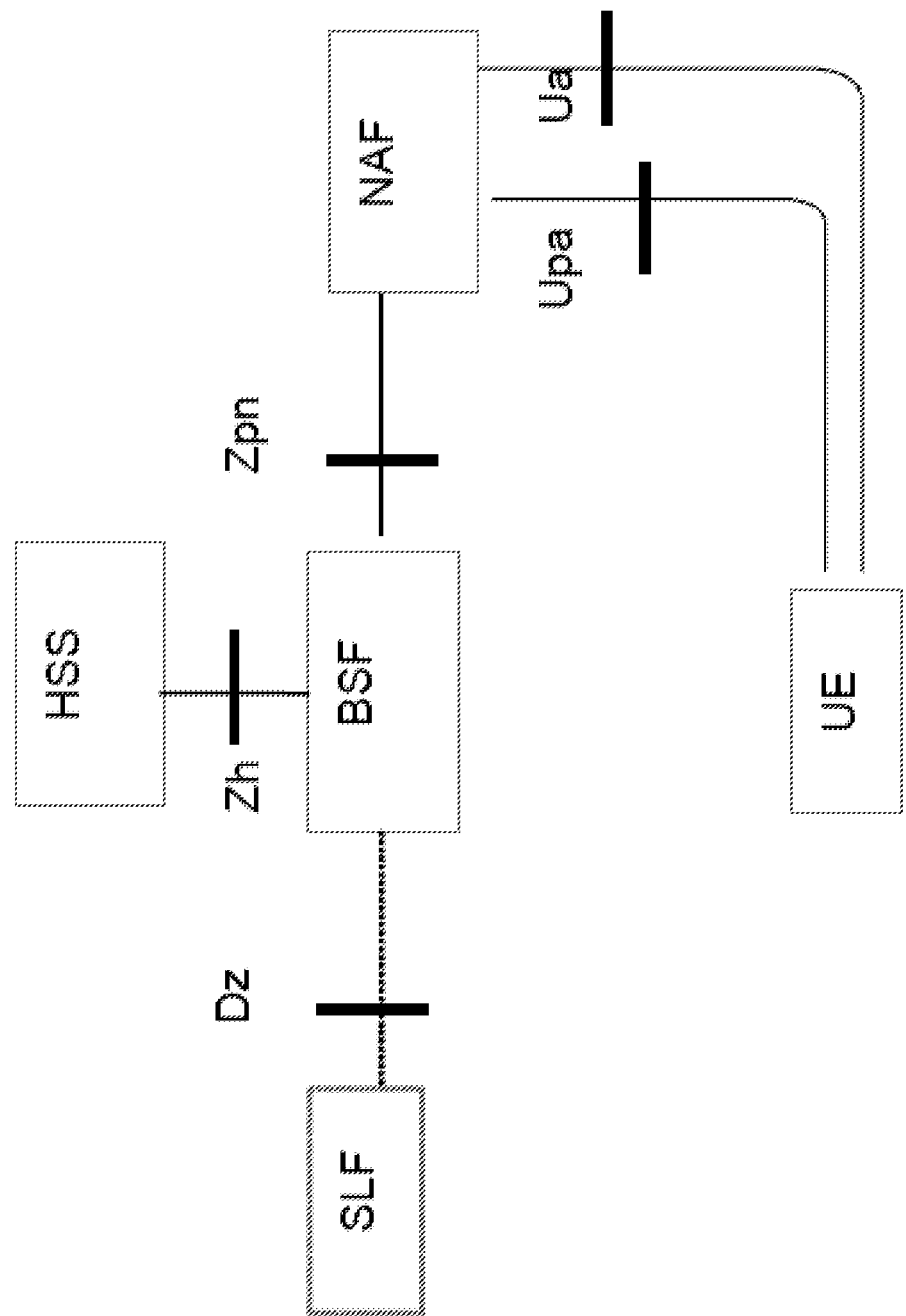
FIG. 4 shows a schematic diagram of an example of an alternative architecture that can be used in accordance with the present invention, in particular when generic bootstrapping architecture (GBA) is used.

With reference to FIG. 4, an example Processing and message flow for GBA Push follows:
1. A NAF establishes a shared NAF SA with a UE which is registered for Push services. It knows the identity of the subscriber.
2. The Push-NAF generates the GPI (GBA Push info) Request and sends the GPI Request to the BSF.
3. Upon receiving the request from the NAF, the BSF checks that the NAF is authorized, and resolves the requested subscriber identifier to a private identifier (e.g. IMSI).
4. The BSF fetches a new AV (authentication vector) and subscriber's GUSS (GBA User Security Settings) from the HSS.
5. The HSS sends the AV and the GUSS to the BSF.
6. When the BSF receives the AV Response from the HSS, it generates the NAF keys based on the requested NAFJd and creates the relevant GPI Response.
7. The BSF sends the GPI Response to the NAF.
8. The NAF stores the received information together with other user information in a NAF SA.
9. The NAF then forwards the GPI to the UE over Upa using the selected transport mechanism and the given transport address.
10. When the UE receives the message containing the GPI, it processes the GPI as for regular GBA, and stores the corresponding NAF SA(s)

The UE and NAF are now ready to use the established NAF SA.

TR33.223 specifies that Upa is a new interface that is separate from Ua—"a new reference point Upa is introduced between the NAF and the UE" (Section 4.2.1). As such, the Ua interface should be unaware of whether GBA or GBA-push is being used.

3. Provisioning the Address of the BSF and the NAF

The address of the BSF (http URL) may be pre-loaded when the device is manufactured. It could be device managed itself, which would seem to create a "chicken-and-egg" problem, but the DM Server could, for instance, provide an address for an acceptable BSF in the ServerHello. Or http traffic might be routed by the M2M mobile operator to a default BSF address. Similarly, the location of the preferred DM Server might need to be pre-loaded, or the M2M mobile operator could route CoAP traffic to a default DM Server address.

4. Flavour of GBA (GBA-ME. GBA-U. GBA-SIM Etc.)

Several different versions of GBA are referenced in "Details of 3GPP standards and technologies used to implement aspects of the method and system". GBA-U has security advantages, but also logistic advantages: it permits a longer lifetime for the B-TID as the derived key is stored more securely. It allows safe retention of Ks during power-off cycles for instance. GBA-U requires specific support from the UICC, so would have a (modest) increment to the cost. Since M2M devices are typically provided with a new UICC anyway at manufacture, it is a software/development cost rather than a hardware cost. Also, in a model with a customised UICC, this may allow for a solution using restricted AT commands to the modem, rather than full AT+CSIM.

5. Location of the NAF (DM Server) and Type of Zn Interface

The architecture example allows for there to be several DM Servers in different locations: it could be part of an M2M platform (e.g. M2M mobile operator) cluster, or hosted elsewhere by a network operator/service provider, or perhaps by a customer of said operator/provider. The BSF may need to be located within a firewalled Demilitarized Zone (DMZ), or perhaps connected via an http proxy in the DMZ (so allowing external http Web Service access from NAFs), and then would execute the Diameter interface to the HLR/HSS. It may be undesirable to expose an http interface directly onto the server supporting the HLR, or to tunnel Diameter through firewalls. However, if the DM Server is itself part of the M2M platform cluster then this may be over-engineering. Possibly, a Diameter solution for the Zn interface then becomes acceptable.

6. Use of Zh or Zh' Interface

Ideally, the HLR may be upgraded to a full HSS with support for the Zh reference point. However, if the HLR/HSS only supports Zh' then the BSF will need to be more complicated, and take on some of the subscription management functions (profiling, lifetime, security policies) typically associated with the HSS.

7. Development of NAF Component

While the NAF functionality looks fairly straightforward, it will need to be developed for each DM Server used, and for each additional application which uses GBA.

GBA keys could be used to protect SMS (e.g. encrypt/integrity protect SMS using a secure packet interface e.g. like ETSI TS 1 02.225 which is used for SIM OTA). This SMS channel is likely to be more efficient than DTLS.

In addition, regardless of GBA, a secure SMS protocol could be linked to a Device and/or Service management protocol, namely: using a secure SMS protocol (e.g. originally designed for SIM OTA (102 225)), but now adapted for LWM2M communications, combined with using the LWM2M protocol to define (and manage) the necessary parameters for the secure SMS protocol (i.e. the relevant KIc, KID, SPI, TAR, and keys). GBA could be used to securely derive the keys.

Further aspects and advantageous or preferable features are described in the following paragraphs.

LWM2M needs a security solution for the SMS bearer. Without a solution, SMS will not be usable as a bearer, severely limiting scope of LWM2M. A solution to this problem is to use SIM OTA security (e.g. see TS 1 02 225).

TS 102.225 relies on the keys and parameters being already agreed between client and server. However, it is difficult to pre-load these into LWM2M client devices, and ensure that they are sent to servers, because there is no present infrastructure for doing so. It would be pointless to deliver the keys and parameters over unsecured SMS.

There are various proposed solutions for delivering these keys and parameters in a secure way.

In a first solution, there is provided switching bearer to UDP/Coap and running DTLS. The DTLS session can be used to secure the LWM2M Bootstrap protocol. The LWM2M Bootstrap can be used to set the TS 1 02.225 keys and parameters securely. Note that managed resources/objects need to be defined to allow the Bootstrap server to update them; the format of these resources is specified in the numbered paragraphs below.

In a second solution, there is provided relying on a SIM card (UICC) which has already having been provisioned with keys and parameters, and using this card to terminate TS 102 225 security. Please note that, because this solution provides a secure channel, the same channel can be used to deliver other keys and parameters.

In a third solution, there is provided use of GBA to set up the keys and parameters. This works because the GPI (GBA Push Info) can be delivered over unsecured SMS. So, there is no requirement to have an initial key to protect the SMS. (Note that the delivery of the parameters like Kic, KID, SPI and TAR is not obvious, but these are only 6 bytes, and there are fields in the GPI e.g. App Lbl, NAFJd, P-TID which could be used to carry this info.)

Further details are provided in the numbered paragraphs below.

UDP channel security for [COAP] is referenced in "Details of 3GPP standards and technologies used to implement aspects of the method and system" above.

Since the LWM2M protocol utilizes DTLS for authentication, data integrity and confidentiality purposes, the LWM2M Client and LWM2M Server SHOULD keep a DTLS session in use for as long a period as can be safely achieved without risking compromise to the session keys and counters. If a session persists across sleep cycles, encrypted and integrity-protected storage SHOULD be used for the session keys and counters.

Note that the Client-Server relationship of DTLS (i.e. who initiated the handshake) is separate from the Client-Server relationship of LWM2M.

Considering that any device with a LWM2M Client can be managed by any LWM2M Server and LWM2M Bootstrap Server the choice of Cipher Suites is not limited to the list defined in Section 9 of [CoAP]. Due to the sensitive nature of Bootstrap Information, particular care has to be taken to ensure protection of that data including constraints and dependencies within a LWM2M Client/Bootstrap Server relationship according to the adopted security mode.

Concerning Bootstrap from a Smartcard, the same care has to be taken and a secure channel between the Smartcard and the LWM2M Device SHOULD be established as described in Appendix H of OMA LWM2M in reference to GlobalPlatform Secure Channel Protocol 03 (SCP 03) Amendment D v1.1 September 2009.

The keying material used to secure the exchange of information using a DTLS session may be obtained using one of the bootstrap modes referenced in "Details of 3GPP standards and technologies used to implement aspects of the method and system" above.

The Resources (i.e. "Security Mode", "Public Key or Identity", "Server Public Key or Identity" and "Secret Key") in the LWM2M Security Object that are associated with the keying material are used either 1) for providing UDP channel security in "Device Registration", "Device Management & Service Enablement", and "Information Reporting" Interfaces if the LWM2M Security Object Instance relates to a LWM2M Server, or, 2) for providing channel security in the Bootstrap Interface if the LWM2M Security Object instance relates to a LWM2M Bootstrap Server.

LWM2M Clients MUST either be directly provisioned for use with a target LWM2M Server (Manufacturer Pre-configuration bootstrap mode) or else be provisioned for secure bootstrapping with an LWM2M Bootstrap Server. Any LWM2M Client which supports Client or Server initiated bootstrap mode MUST support at least one of the following secure methods:

1) Bootstrapping with a strong (high-entropy) pre-shared secret, as described in section 7.1 of OMA LWM2M. The cipher-suites defined in this section MUST NOT be used with only a low-entropy pre-shared secret.

2) Bootstrapping with a temporary, low-entropy pre-shared secret (such as a PIN, password and private serial number) using the cipher-suite TLS_ECDHE_PSK_WITH_AES_128_CBC_SHA256, as defined in RFC5489.

3) Bootstrapping with a public key or certificate-based method (as described in sections 7.1 0.2 and 7.1.3 of OMA LWM2M). The LWM2M client MUST use a unique key-pair, one which is unique to each LWM2M client.

For full interoperability, a LWM2M Bootstrap Server SHALL support all of these methods.

NOTE: The above security methods can also be used by the LWM2M Bootstrap Server to provision KIc and KID for SMS channel security (see below for SMS channel security).

SMS Channel Security

SMS Secured Packet Structure Mode

The Secured Packet Structure is based on [3GPP TS 31 1 15]/[ETSI TS 102 225]] which is defining secured packets for different transport mechanisms. The solution was originally designed for securing packet structures for UICC based applications, however, for LWM2M it is suitable for securing the SMS payload exchanged between client and server.

The SMS Secured Packet Structure mode specified in this section MUST be supported when the SMS binding is used.

A LWM2M Client which uses the SMS binding MUST either be directly provisioned for use with a target LWM2M Server (Manufacturer Pre-configuration bootstrap mode or Smart Card Provisioning) or else be able to bootstrap via the UDP binding.

The end-point for the SMS channel (delivery of mobile terminated SMS, and sending of mobile originated SMS) SHALL be either on the smartcard or on the device. When the LWM2M Client device doesn't support a smartcard, the end-point is on the LWM2M Client device.

A LWM2M Client, Server or Bootstrap Server supporting SMS binding SHALL discard SMS messages which are not correctly protected using the expected parameters stored in the "SMS Binding Key Parameters" Resource and the expected keys stored in the "SMS Binding Secret Keys" Resource, and SHALL NOT respond with an error message secured using the correct parameters and keys.

Device End-Point

If the SMS channel end-point is on the device the following settings SHALL be applied: Class 1 SMS as specified in [3GPP TS 23.038]

TP-PID of 1 1 1 101 (ME Data Download) as specified in [3GPP TS 23.040]

TP-OA: the TP-OA (originating address as defined in [3GPP 23.040] of an incoming command packet (e.g CoAP request) MUST be re-used as the TP-DA of the outgoing packet (e.g CoAP response)

Smartcard End-Point

If the SMS channel end-point is on the smart card the following settings SHALL be applied:

Class 2 SMS as specified in [3GPP TS 23.038]. The [3GPP TS 23.040] SMS header MUST be defined as below:
TP-PID: 1 1 1 1 1 1 (USIM Data Download) as specified in [3GPP 23.040]
TP-OA: the TP-OA (originating address as defined in [3GPP 23.040] of an incoming command packet (e.g CoAP request) MUST be re-used as the TP-DA of the outgoing packet (e.g CoAP response)

SMS Secured Packet Mode Mechanisms

1. Secure SMS Transfer to UICC

A SMS Secured Packet encapsulating a CoAP request received by the LWM2M device, MUST be—according to [ETSI TS 102 225]/[3GPP TS 31.1 15]—addressed to the LWM2M UICC Application in the Smartcard where it will be decrypted, aggregated if needed, and checked for integrity.

If decryption and integrity verification succeed, the message contained in the SMS MUST be provided to the LWM2M Client.

If decryption or integrity verification failed, SMS MUST be discarded.

The mechanism for providing the decrypted CoAP Request to the LWM2M Client relies on basic GET DATA commands of [GP SCP03]. This data MUST follow the format as below data_rcv_::=<addressxcoap_msg>
address::=TP OA; originated address
coap_msg::=COAP TAG <coap_request_lengthxcoap_request>
coap_request_length::=16BITS_VALUE
coap_request::=CoAP message payload NOTE: In current LWM2M release, the way the LWM2M Client Application is triggered for retrieving the available message from the Smartcard is at the discretion of the device: i.e. a middle class LWM2M Device implementing [ETSI TS 102 223] ToolKit with class "e" and "k" support could be automatically triggered by Toolkit mechanisms, whereas a simpler LWM2M device could rely on a polling mechanisms on Smartcard for fetching data when available.

2. Secured SMS Transfer to LWM2M Server

For sending a CoAP message to the LWM2M Server, the LWM2M Client prepares a data containing the right TP-DA to use, concatenated with the CoAP message and MUST provide that data to the LWM2M UICC Application in using the [GP SCP03] STORE-DATA command.

According to [ETSI TS 102 225]/[3GPP TS 31.1 15] the Smartcard will be in charge to prepare (encryption/concatenation) the CoAP message before sending it as a SMS Secure Packet ([ETSI TS 102 223] SEND_SMS command).

The SMS Secured Packet MUST be formatted as Secured Data specified in section 7.3.1.2.

The Secure Channel as specified in Annex H SHOULD be used to provide the prepared data to the Smartcard.

The SMS channel security is provided by the Secured Packet Structure [ETSI TS 102 225] and [SCP080] which is defining secured packets for different transport mechanisms.

The solution was originally designed for securing packet structures for UICC based applications, however, for LWM2M it is suitable for securing the SMS channel between client and server.

The SMS channel security specified in this section MUST be applied when the SMS binding is used.

When the LWM2M device supports a smartcard, the security SHOULD be terminated on the smartcard. The LWM2M client SHOULD pass SMS messages to the smartcard for encryption and integrity protection before sending, and SHOULD pass encrypted SMS messages received from the LWM2M server to the smartcard for decryption and integrity checking.

A LWM2M Client which supports the SMS binding SHALL support the Secured Packet Structure as defined in [ETSI TS 102 225] and [SCP080]. The LWM2M Client SHALL share the relevant keys—identified by KIc and KID—with a LWM2M Bootstrap Server during bootstrapping, or with a LWM2M Server otherwise.

A LWM2M Bootstrap Server which supports the SMS binding SHALL support the Secured Packet Structure as defined in [ETSI TS 102 225] and [SCP080].

A LWM2M Server which supports the SMS binding SHALL support Secured Packet Structure as defined in [ETSI TS 102 225] and [SCP080].

In SMS Secured Packet Structure mode, a CoAP message as defined in [CoAP] MUST be encapsulated in [3GPP 31.1 15] Secured Packets, in implementing—for SMS Point to Point (SMS_PP)—the general [ETSI 102 225] specification for UICC based applications.

The following applies to LWM2M Client and LWM2M Bootstrap Server and LWM2M Server:

The "Command Packet" command specified in [3GPP 31.1 15]/[ETSI TS 102 225] MUST be used for both CoAP Request and Response message.

The Structure of the Command Packet contained in the Short Message MUST follow [3GPP 31.1 15] specification.

Single DES SHALL NOT be relied on.

AES or Triple DES with three different keys MUST be used.

Preferably, AES should be used. Where

Single DES SHALL NOT be relied on.

AES or Triple DES with three different keys MUST be used.

Preferably, AES should be used. Where AES is used it should be used with CBC mode for encryption (see coding of KIc in [ETSI TS 102 225] section 5.1.2) and in CMAC mode for integrity (see coding of KID in [ETSI TS 102 225] section 5.1.3).
SPI SHALL be set as follows (see coding of SPI in [ETSI TS 102 225] section 5.1.1):
cryptographic checksum
ciphering
  The ciphering and crypto graphic checksum MUST use either AES or Triple DES
  Single DES SHALL NOT be used
  AES SHOULD be used
  When Triple DES is used, then it MUST be used in outer CBC mode and 3 different keys MUST be used
  When AES is used it MUST be used with CBC mode for ciphering (see coding of KIc in [ETSI TS 102 225] section 5.1.2) and in CMAC mode for integrity (see coding of KID in [ETSI TS 102 225] section 5.1.3
  process if and only if counter value is higher than the value in the RE
  Preferably, TAR (see coding of TAR in [ETSI TS 101 220], section 6) SHALL be set to a value in the range BF FF 00-BF FF FF.
NOTE: A TAR for LWM2M SMS security will be requested from ETSI SCP and the range above applies only until the TAR has been assigned.
  Secured Data: contains the Secured Application Message which MUST be coded as a BER-TLV, the Tag (TBD: e.g 0x05) will indicate the type (e.g CoAP type) of that message.
There will be two different TARs for terminating the security on the smartcard or on the device. The ciphering and integrity keys and associated counter values SHOULD be held in a smart card or other tamper-resistant secure storage environment (e.g. embedded secure element). The client SHOULD pass MT SMS to the smart card/SE for decryption and integrity checking, and SHOULD pass MO SMS to the smart card/SE for encryption and integrity protection before sending.
If the keys and associated counter values are not stored in the above recommended way, they SHALL be treated as session keys with a lifetime no greater than the duration of the Registration Lifetime. The LWM2M Client SHALL acquire fresh discard the key material on each "Register" or "Update" operation, load fresh key material using one of the mechanisms described below, and reset the counters.
  Re-bootstrapping via the GBA Push mechanism, as described in [OMA DM v2.0] section 9.3.1.3. GBA Push uses a UICC to generate a so called Ks_(ext/int)_NAF shared secret both in the network and in the device. From this master key Ks_(ext/int)_NAF, two session secrets are then generated: the DMBEK and the DMBIK. The value of the KIc (ciphering key for SMS) SHALL be set by truncating DMBEK to the relevant key length (taking bits 0 to 127 for AES-128, or bits 0 to 167 bits for 3DES), and the value of the KID (integrity key for SMS) SHALL similarly be set by truncating DMBIK to the relevant key length (bits 0 to 127 for AES-128, or bits 0 to 167 for 3DES). The GBA Push Info SHALL be delivered to the LWM2M Client using a Class 1 SMS as specified in [3GPP TS 23.038] with a TP-PID of 1 1 1 101 (ME Data Download) as specified in [3GPP TS 23.040].
  Re-bootstrapping from the Smart Card by one of the following methods:
  Using the above-described GBA Push mechanism, specifically with GBA-U, and with the Smart Card generating the DMBIK and DMBEK from Ks_int_NAF.
  Using Remote File Management (RFM) or Remote Application Management (RAM) as specified in [ETSI TS 102.226]. The LWM2M Server SHALL generate random new key data of appropriate length for KIc and KID and ensure these are delivered to the Smart Card by a Class 2 SMS as specified in [3GPP TS 23.038] with a TP-PID of 1 1 1 1 1 1 (USIM Data Download) as specified in [3GPP TS 23.040], protected using the relevant OTA security keys for RFM or RAM.
The Smart Card SHALL place the updated session keys in the provisioning file EF_LWM2M_Bootstrap.
  Re-bootstrapping via the UDP binding, secured as described in Section 7.1 (UDP Security). Where the UDP binding is unavailable, the LWM2M Server (or Bootstrapping Server) SHOULD send SMS to the LWM2M Client to refresh the session keys before the next attempted "Register" or "Update" operation. If the LWM2M Client attempts to contact the LWM2M Server using an expired registration, or attempts to "Register" or "Update" using a stale key, the LWM2M Server SHALL respond with an error (4.00 Bad Request) and SHALL send SMS to refresh the session keys. However, the LWM2M Server SHOULD send such SMS prior to the expiry of the current Registration, if the LWM2M Client is awake; or if the LWM2M Client is in a sleep cycle, the LWM2M Server (or Bootstrapping Server) SHOULD send such SMS on the next wake up. These measures will avoid a failed "Register" or "Update" operation.
  As for Section 7.1 (UDP Security), where a session persists across sleep cycles, encrypted and integrity-protected storage SHOULD be used for the session keys and counters. Alternatively, new session keys SHALL be established by one of the above mechanisms on wake up from a sleep cycle.
  Preferably, KIc, KID, SPI and TAR SHALL be stored in the "SMS Binding Key Parameters" Resource. Preferably, the corresponding key values should be stored in the "SMS Binding Secret Keys" Resource.
  A LWM2M Client which uses the SMS binding may either be directly provisioned for use with a target LWM2M Server (Manufacturer Pre-configuration bootstrap mode) or else be able to bootstrap via the UDP binding.
  A LWM2M Client, Server or Bootstrap Server supporting SMS binding SHALL discard SMS messages which are not correctly protected using the expected parameters stored in the "SMS Binding Key Parameters" Resource and the expected keys stored in the "SMS Binding Secret Keys" Resource, and SHALL NOT respond with an error message secured using the correct parameters and keys.

LWM2M Object: LWM2M Security

Description: This LWM2M object provides the keying material of a LWM2M Client appropriate to access a specified LWM2M Server. One Object Instance SHOULD address a LWM2M Bootstrap Server. These LWM2M object resources MUST only be changed by a LWM2M Bootstrap Server or SmartCard provisioning and MUST NOT be accessible by any other LWM2M Server.

Example Object Info:

| Object | Object ID | Object URN | Multiple Instances? | Mandatory? |
|---|---|---|---|---|
| LWM2M Security | 0 | | Yes | Yes |

Resource Info:

| Resource Name | Type | Range or Enumeration | Units | Descriptions |
|---|---|---|---|---|
| LWM2M Server URI | String | 0-255 bytes | — | Uniquely identifies the LWM2M Server or LWM2M Bootstrap Server, and is in the form: "coaps://host:port", where host is an IP address or FQDN, and port is the UDP port of the Server. |
| Bootstrap Server | Boolean | | — | Determines if the current instance concerns a LWM2M Bootstrap Server (true) or a standard LWM2M Server (false) |
| Security Mode | Integer | 0-3 | — | Determines which UDP channel security mode is used<br>0: Pre-Shared Key mode<br>1: Raw Public Key mode<br>2: Certificate mode<br>3: NoSec mode |
| Public Key or Identity | Opaque | | — | Stores the LWM2M Client's Certificate (Certificate mode), public key (RPK mode) or PSK Identity (PSK mode). The format is defined in Section E.1.1. |
| Server Public Key or Identity | Opaque | | — | Stores the LWM2M Server's or LWM2M Bootstrap Server's Certificate (Certificate mode), public key (RPK mode) or PSK Identity (PSK mode). The format is defined in Section E.1.1. |
| Secret Key | Opaque | | — | Stores the secret key or private key of the security mode. The format of the keying material is defined by the security mode in Section E.1.1. This resource MUST only be changed by a bootstrap server and MUST NOT be readable by any server. |
| SMS Security Mode | Integer | 0-255 | — | Determines which SMS payload security mode is used (see section 7.2)<br>0: Reserved for future use<br>1: Secure Packet Structure mode device terminated<br>2: Secure Packet Structure mode smartcard terminated<br>3: NoSec mode<br>255: Proprietary modes |
| SMS Binding Key Parameters | Opaque | 6 bytes | — | Stored the Kic, KID, SPI and TAR. The format is defined in Section D.1.2. |
| SMS Binding Secret Keys | Opaque | 32-48 bytes | — | Stores the values of the keys for the SMS binding.<br>This resource MUST only be changed by a bootstrap server and MUST NOT be readable by any server. |
| LWM2M Server SMS Number | Integer | | | MSISDN used by the LWM2M Client to send massages to the LWM2M Server via the SMS binding.<br>The LWM2M Client SHALL silently ignore any SMS not originated from unknown MSISDN |
| Short Server ID | Integer | 1-65535 | — | This identifier uniquely identifies each LWM2M Server configured for the LWM2M Client.<br>This resource MUST be set when the Bootstrap Server resource has false value. Default Short Server ID (i.e. 0) MUST NOT be used for identifying the LWM2M Server. |
| Client Hold Off Time | Integer | | s | Relevant information for a Bootstrap Server only.<br>The number of seconds to wait before initiating a Client Initiated Bootstrap once the LWM2M Client has determined it should initiate this bootstrap mode |

UDP Channel Security: Security Key Resource Format

This section defines the format of the Secret Key and Public Key and Identity resources of the LWM2M Server and LWM2M Bootstrap Objects when using UDP Channel security. These resources are used to configure the security mode and keying material that a Client uses with a particular Server. The Objects are configured on the Client using one of the Bootstrap mechanisms described in Section 5.1 of OMA LWM2M. The use of this keying material for each security mode is defined in Section 7.1 of OMA LWM2M.

Pre-Shared Key (PSK) Mode

The PSK is a binary shared secret key between the Client and Server of the appropriate length for the Cipher Suite used [RFC4279]. This key is composed of a sequence of binary bytes in the Secret Key resource. The default PSK Cipher Suites defined in this specification use a 128-bit AES key. Thus this key would be represented in 16 bytes in the Secret Key Resource.

The corresponding PSK Identity for this PSK is stored in the Public Key or Identity resource. The PSK Identity is simply stored as a UTF-8 String as per [RFC4279]. Clients and Servers MUST support a PSK Identity of at least 128 bytes in length as required by [RFC4279].

Raw-Public Key (RPK) Mode

The raw-public key mode requires a public key and a private key of the appropriate type and length for the Cipher Suite used. These keys are carried as a sequence of binary bytes with the public key stored in the Public Key or Identity Resource, and the private key stored in the Secret Key Resource. The default RPK Cipher Suites defines in this specification use a 256-bit ECC key. Thus the Certificate Resource would contain a 32 byte public key and the Secret Key Resource a 32 byte private key.

Certificate Mode

The Certificate mode requires an X.509v3 Certificate along with a matching private key. The private key is stored in the Secret Key Resource as in RPK mode. The Certificate is simply represented as binary X.509v3 in the value of the Public Key or Identity Resource.

SMS Payload Security: Security Key Resource Format

This section defines the format of the Secret Key and Public Key and Identity resources of the LWM2M Server and LWM2M Bootstrap Objects when using SMS Payload security. These resources are used to configure keying material that a Client uses with a particular Server. The Objects are configured on the Client using one of the Bootstrap mechanisms described in Section 5.1. The use of this keying material is defined in Section 7.2.

The SMS key parameters are stored in the order KIc, KID, SPI, TAR (KIc is byte 0).

Ordering of bits within bytes SHALL follow ETSI TS 102 221 "Coding Conventions" (b8 MSB, b1 LSB).

Unbootstrapping

If a Security Object Instance is to be deleted, some related resources and configurations need to be deleted or modified. Therefore when Delete operation is sent via Bootstrap Interface, the Client MUST proceed following procedure.
1. If there is an Object Instance that can be accessed only by a Server of the Server Object Instance (i.e. the Server is Access Control Owner and the LWM2M Server can access the Object Instance only in an Access Control Object Instance), the Object Instance and the corresponding the Access Control Object Instance MUST be deleted
2. If an Object Instance can be accessed by multiple Servers including the Server which Security Object Instance is to be deleted, then:
   An ACL Resource Instance for the Server in Access Control Object Instance for the Object Instance MUST be deleted
   If the Server is Access Control Owner of the Access Control Object Instance, then the Access Control Owner MUST be changed to another Server according to the rules below: The Client MUST choose the Server who has highest sum of each number assigned to an access right (Write: 1, Delete: 1) for the Access Control Owner. If two or more Servers have the same sum, the Client MUST choose one of them as the Access Control Owner.
3. Observation from the Server MUST be deleted
4. The Server Object Instance MUST be deleted
5. Client MAY send "De-register" operation to the Server
Note: To monitor the change of Access Control Owner, the Server MAY observe Access Control Owner Resource.

Figure 5:
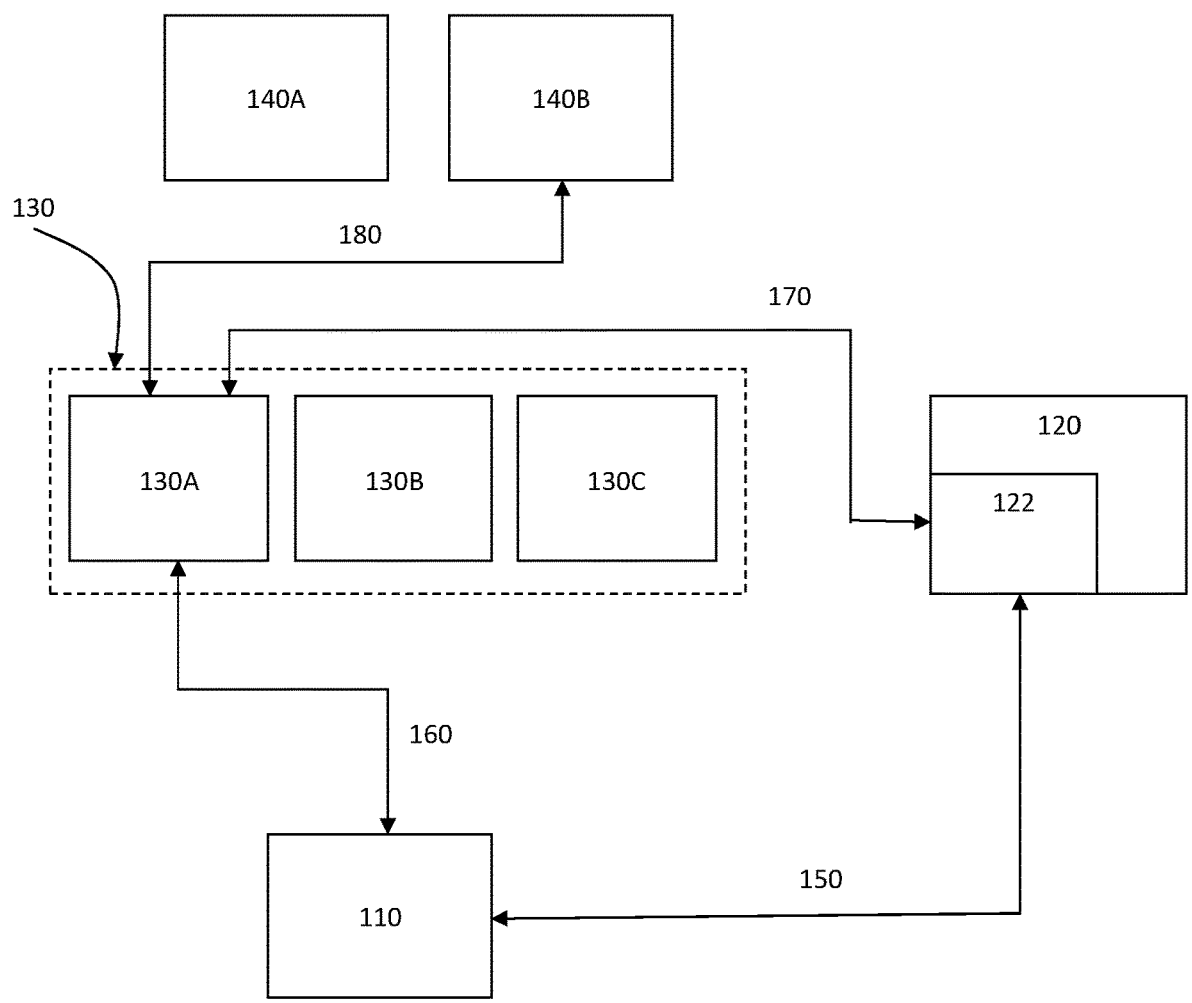
FIG. 5 shows a schematic diagram of an example of a further architecture that can be used in accordance with the present invention, in particular when GBA is used.

FIG. 5 shows a schematic diagram of an example of a GBA architecture that is similar to that of FIG. 2, but where the BSF 1 30 has a scaled, distributed or cluster architecture comprising multiple server instances 130A, 1 30B and 1 30C. FIG. 5 also shows multiple instances of HLR/HSS 140A and 140B.

In the arrangement shown in FIG. 5, it is desirable that in a bootstrapping process, for example one based on GBA or a GBA-like architecture, when the NAF 122 requests a shared key (for example, a shared secret such as Ks_NAF) for a particular UE 1 1 0, the request is routed to the BSF server instance that holds or can correctly derive the relevant shared key, or can return data using which the NAF 122 can derive the relevant shared key. In the example shown in FIG. 5, this is BSF server instance 1 30A. There are a number of ways in which this may be achieved.

In a first aspect, a BSF server instance pointer is included in at least part of data that is supplied by the UE 1 1 0 to the BSF 1 30 as part of the bootstrapping process (for example, as part of a GET request). The pointer can then be used for routing decisions within the network so that the Ub interface 1 60 is routed to the BSF server instance indicated by the pointer (in the example shown in FIG. 5 this is BSF server instance 1 30A).

Any one or more data items that are passed from the UE 1 10 to the BSF 130 as part of the bootstrapping process may include a pointer to a particular BSF server instance. For example, in step 21 5 of the GBA process described above and shown in FIG. 3, the UE 1 1 0 contacts the BSF 1 30. This contact may be a basic GET request. As explained in detail in TS 24.109-Section 4.3 and Annex A.3, in particular Table A.3-1, this message could contain one or more of a "Request URI" (/ by default, but could contain other data), a "Host" (BSF domain name and port), a "User Agent field, a "Date" field and an "Authorization" field (which in turn contains a "private user identity", a "realm" (equal to the host), a "nonce", a "uri" (equal to the Request URI) and a "response" field). The "private user identity" (which is likely to be the IMPI, I MS I, TMPI or TMSI, although could be any other identifier) may be the most useful of these fields for inclusion of the pointer. These fields may contain designated components (for example, certain bits or bytes, or a domain name component, etc), that may identify the relevant BSF server instance in the cluster of BSF server instances. However, it will be appreciated that at least part of any one or more of the above identified items could include a pointer to a BSF server instance.

Furthermore, the next "GET" message from the UE 1 10 to the BSF 130 (defined in Table A.3-4 of TS 24.109) contains the same parameters as the first GET message with some additional items: the "nonce", "opaque" and "algorithm", which are copied from the "401 unauthorized" message (identified below), and also a random client nonce "cnonce", nonce count "nc" and the "response", which is computed using HTTP Digest Authentication (RFC2617) treating the "RES" as the password. Again, it will be appreciated that at least part of any one or more of these items could include the pointer.

Furthermore, at least part of any other data passed from the UE 1 10 to the BSF 130 during a bootstrapping process may include a pointer to a particular BSF server instance. For example: any additional fields and messages exchanged during Ub 160 communications error cases; any extensions to the Ub 160 messages with additional non-standard fields or headers (to communicate yet more shared data); and any parameters that might be exchanged as a result of tunnelling the Ub interface.

The data items that are supplied by the UE 110 to the BSF 130 over the Ub interface 160 may ultimately be under the control of whoever provisions the UE 110 and how it is provisioned. For example, a data item(s) may be set to include a pointer to a particular BSF server instance 130A by the original equipment manufacturer (OEM), or by a network operator when it provisions a smart card associated with the UE 110 with parameters such as the IMSI, or during earlier device management, in which case the pointer would be under the control of whichever entity performed that device management.

Not only is the pointer used to route the Ub interface 160 to a particular BSF server instance 130A, it may also be used to route the Zn interface 1 70 between the NAF 1 22 and the BSF 130 to the same BSF server instance. To achieve this, the UE 1 10 may pass the pointer to the NAF 122 via the Ua interface 150 during the bootstrapping process, or at any other suitable time. For example, the pointer may be at least a part of data that is passed to the NAF 1 22 during a bootstrapping process (for example, part of an identifier of the UE 1 1 0). In this case, the NAF 1 22 may receive the pointer as part of data received from the UE 1 10 during the bootstrapping process. Alternatively, the UE 1 10 may extract the pointer from the data and pass it to the NAF 122 via Ua 1 50, or any other suitable interface, during the bootstrapping process or at any other suitable time.

When the NAF 122 then comes to request the shared secret (for example, Ks_NAF) from the BSF 130 for that particular UE 110, it may pass the data comprising the pointer (for example, an identifier of the UE 110) to the BSF 130, and the pointer can be used for routing decisions within the network so that the Zn interface 170 is routed to the correct BSF server instance 130A.

Alternatively, after receiving the data comprising the pointer, the NAF 122 may extract the pointer from the data and then include the pointer in any Zn 170 communications to the BSF 130 so that the Zn 170 interface is routed to the correct server instance 1 30A by the network. The NAF 1 22 may keep a record of the pointer with an identifier of the UE 110 so that for any later communications with the BSF 130 in respect of that particular UE 110, the NAF 122 can look-up the pointer associated with the UE 110 and include the pointer in Zn 170 communications that relate to that particular UE 1 10. The NAF 122 may, for example, include the pointer within any parameter that is passed to the BSF 130 over the Zn interface 170.

Details of the information that the NAF 122 is able to pass to the BSF 1 30 using the Zn 170 interface are described in TS29.109, Section 5.2-5.4. The information includes "Session ID", "Address" and "Realm" of both the NAF 122 and the BSF 1 30 (only for Diameter 5.2), the "Transaction Identifier" (B-TID), the "NAF-ID" and a "GBAJJ-Awareness-Indicator". There are also some optional "GAA-Service-Identifier", "AVP", "Proxy Info" and "Route Record" fields (Diameter, 5.2) or an optional "extension" field (for Web Services 5.3). Any of these parameters may be used to incorporate the pointer such that the Zn interface 170 is routed to the correct BSF server instance 130A.

In a further alternative, the NAF 122 may extract the pointer from a data item it receives from the UE 110 (and optionally keep a record of it) and also use the data item that comprises the pointer in communication with the BSF 130 so that the pointer within the data item can be used to route Zn 170 to the correct BSF server instance 130A.

As explained above, in this way the BSF server instance 1 30A used in the bootstrapping process between the BSF 130 and UE 1 1 0 may be contacted by the NAF 122 subsequently in order to obtain the bootstrapped shared secret. Thus, requests from the NAF 1 22 for the bootstrapped shared secret may be routed to the BSF server instance 130A that took part in the earlier bootstrapping process and is therefore in a position to return the shared secret, rather than some other bootstrapping server instance (for example, 130B, 1 30C) that cannot provide the shared secret for that device.

In a further aspect, a BSF server instance pointer is included in at least part of data that are supplied by the BSF 1 30 to the UE 1 10 as part of the bootstrapping process. The pointer can then subsequently be used for routing decisions within the network so that the Zn interface 170 is routed to the BSF server instance indicated by the pointer (in the example shown in FIG. 5 this is BSF server instance 1 30A).

For example, at the start of the bootstrapping process, the initial GET request from the UE 110 may be routed to any of the BSF server instances. To which BSF server instance the Ub interface 1 60 is initially routed may be arbitrary, or may be selected in consideration of any one or more factors, for example to achieve load balancing between the BSF server instances etc. Alternatively, the GET request from the UE 1 1 0 to the BSF 130 may comprise a pointer to a particular BSF server instance, to which the Ub interface 160 is initially routed. That BSF server instance may then be used, or the BSF 130 may subsequently re-route the Ub interface 160 to a different BSF server instance for carrying out the bootstrapping process, for example in consideration of load balancing etc. In any case, the BSF server instance that is used to bootstrap the shared secret to the UE 1 10 (for example, 1 30A) may set a pointer to itself within data to be transmitted to the UE 1 1 0 so that subsequent communications between the UE 1 1 0 and BSF 1 30 and/or between the NAF 1 22 and BSF 130 can be routed to that particular server instance.

Any one or more data items that are passed from the BSF server instance 130A to the UE 1 1 0 as part of the bootstrapping process may comprise a pointer to the BSF server instance 130A.

For example, a "401 Unauthorized" response message (defined in Table A.3-3 of TS 24.109) from the BSF 130 to the UE 1 10 contains a "Server" field, another "Date" field, and a "WWW-Authenticate" field (which in turn contains the "realm", a "nonce", an "algorithm" (specified to be AKAv1-MD5), a "qop" field (specified to be "auth-int") and an "opaque" field (which contains random data). It will be appreciated that at least part of any one or more of these items could comprise the pointer. As part of the bootstrapping process, the GAA server 1 14 (see FIG. 2) may pass the RAND and AUTN to the UICC 1 12 and receive in return the RES and CK|IK (which is equal to the Ks). Since the BSF 130 also knows the RES and Ks, these are also data shared between the UE 1 10 and BSF 130, so at least a part of at least one of the RES and Ks could also comprise a pointer to the BSF server instance.

Furthermore, the final "OK" message from the BSF 130 to the UE 1 10 (defined in Table A.3-5 of TS 24.109) contains an "Authentication-Info" field with sub-fields "cnonce", "nc", "opaque", "nonce" and "qop", copied from the "GET" message above, and a further field "rspath" constructed using HTTP Digest authentication from the server. There is also a further date field "Expires" and an xml document in the message body containing the "B-TID" and "Lifetime". Again, it will be appreciated that at least part of any one or more of these items could comprise a pointer to the BSF server instance 130A. However, the B-TID may be the most useful of these fields for inclusion of a pointer to a BSF server instance 130A. The B-TID may contain designated components (for example, certain bits or bytes, or a domain name component, etc), that may identify the relevant BSF server instance 130A in the cluster of BSF server instances.

Other data that may be passed from the BSF 130 to the UE 110 might include: any additional fields and messages exchanged during Ub 160 communications error cases; any extensions to the Ub 160 messages with additional non-standard fields or headers (to communicate yet more shared data); and any parameters that might be exchanged as a result of tunnelling the Ub interface 160.

As explained above, the UE 110 may then pass the pointer to the NAF 122 via the interface Ua 150, or any other suitable interface, as part of the bootstrapping process, or at any other suitable time (either by passing the data within which the pointer was transmitted to the UE 1 10, or separately after the UE 110 has extracted it) and the NAF 122 may then use the pointer in the way identified above so that the Zn interface 1 70 is routed to the correct BSF server instance 130A.

In a further alternative, rather than indicating a BSF server instance, the pointer might indicate a particular HLR/HSS. As shown in FIG. 5, there may be a number of different HLRs/HSSs 140A and 140B that the BSF 130 may contact as part of a bootstrapping process. The pointer may be set to identify a particular HLR/HSS that is to be used during the bootstrapping process (for example, when data transmitted from the UE 110 to the BSF 130 comprises the pointer), or to identify a particular HLR/HSS that has been used during the bootstrapping process (for example, when data transmitted from the BSF 130 to the UE 110 comprises the pointer).

When the BSF 1 30 receives the pointer (either from the UE 1 10 during the process of bootstrapping the shared secret to the UE 1 10, or from the NAF 1 22 when the NAF 1 22 is requesting the shared secret) the BSF 1 30 will be able to identify the HLR/HSS 140A or 140B that it should contact. For example, if a UE identifier comprises the pointer, the BSF 130 may resolve the identifier to a private identifier (such as an IMSI or IMPI), which may then allow the BSF 130 (or some further routing structure) to identify the particular HLR/HSS.

Thus, when the NAF 122 requests the shared secret, the BSF 130 will be able to obtain data from the correct HLR/HSS in order to return the shared secret to the NAF 1 22 for the particular UE 1 1 0 (or return data using which the NAF 122 can derive the correct shared secret). The data obtained from the HLR/HSS might be data using which the BSF 1 30 (or the NAF 1 22) could derive the shared secret, for example, an authentication vector, or a CK and IK, or a Ks (the CK and IK, or Ks, may be derived by the HLR/HSS from a shared key K or Ki, which is shared between a security card, such as a UICC, on the UE 1 10 and the HLR/HSS), or a RAND etc. In this way, the Ub 1 60 and Zn 170 interfaces could be routed to any BSF server instance (which might be useful for dynamic load balancing etc), and the BSF 130 still be capable of retrieving the correct data for the shared secret associated with the particular UE 1 10, so that the NAF 1 22 or UE 1 10 can be supplied with the correct data.

In a further alternative, the pointer may identify both a particular BSF server instance 1 30A, 130B or 130C and also a particular HLR/HSS 140A or 140B, such that the Ub 160 and/or Zn 1 70 interfaces are routed to a particular BSF server instance and the BSF server instance can contact a particular HLR/HSS. In a further alternative, there may be two pointers, one identifying a particular BSF server instance 130A, 130B or 130C and the other identifying a particular HLR/HSS 140A or 140B.

Figure 6:
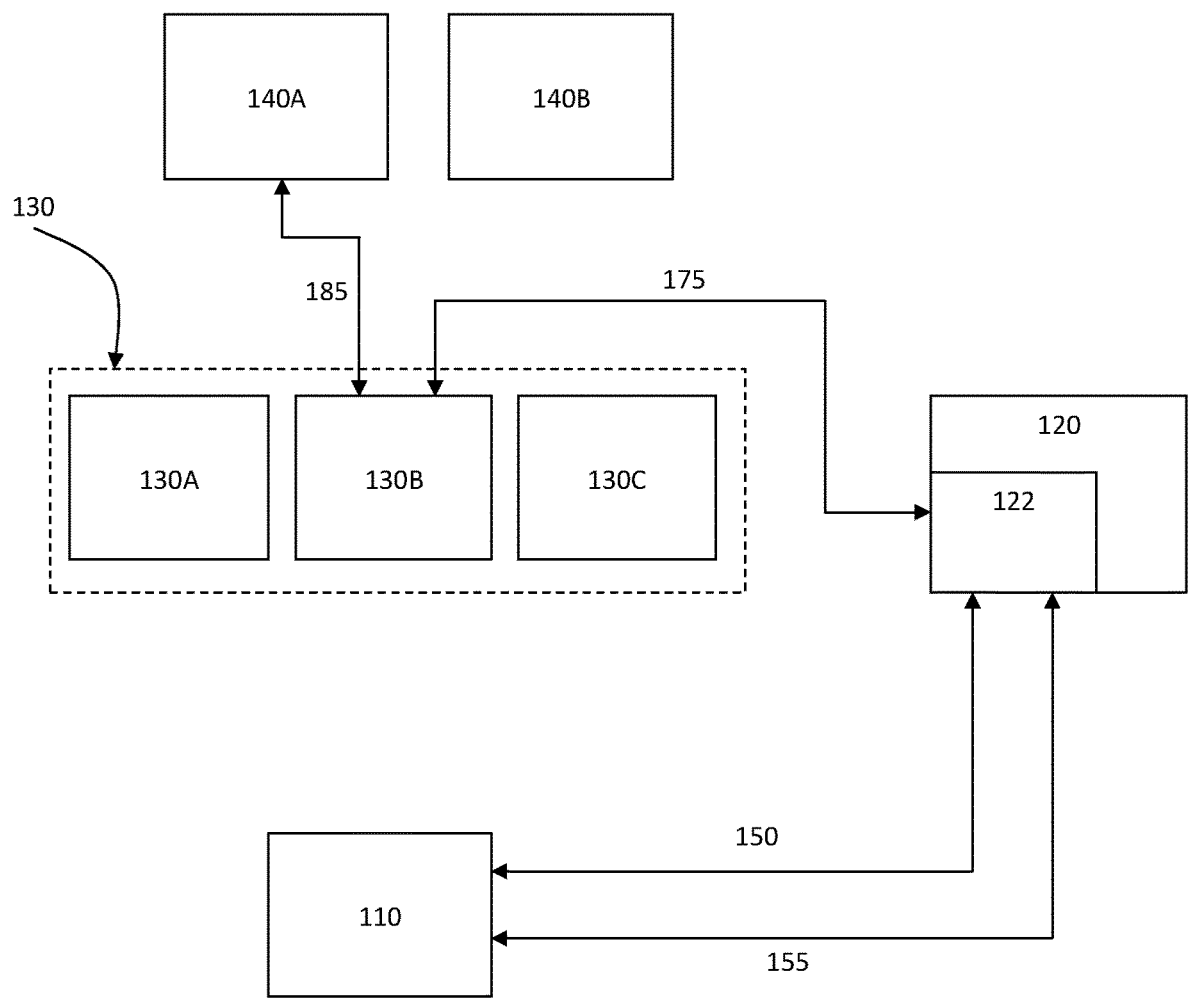
FIG. 6 shows a schematic diagram of an example of an even further example architecture that can be used, in particular when GBA is used.

In accordance with a further aspect, FIG. 6 shows a schematic diagram of an example of a GBA-push architecture that is similar to that of FIG. 4, but where the BSF 130 has a scaled or distributed architecture comprising multiple server instances 130A, 130B and 130C. FIG. 6 also shows multiple instances of HLR/HSS 140A and 140B.

In the arrangement shown in FIG. 6, it may be desirable that after the NAF 122 has received the push information (GPI response, described earlier), it continues to contact the same BSF server instance in any other subsequent communications relating to the UE 1 10 (for example, to request a device security association).

In a first aspect, a BSF server instance pointer is included in at least part of data that is supplied by the NAF 122 to the BSF 130 as part of the push bootstrapping process (for example, a GPI information request).

Details of the information that the NAF 122 is able to pass to the BSF 130 using the Zpn interface 175 are described in TS29.109, Section 5.2-5.4. The information includes the same information identified for Zn 170 above (except that B-TID is replaced by P-TID) and some additional parameters "UE-Id", "UE-Id-Type", "UICC-App-Label", a "UICC-ME" flag, a "Requested-Key-Lifetime", a "Private-Identity-Request" and a "Security-Feature-Request". The UE-Id may be something like the MSISDN, or the I MS I, or an IMS name like an IMPI or IMPU, or any other name by which the NAF 122 may uniquely recognise the UE 1 10 and which the BSF 130 can then resolve to a private identifier (such as an IMSI or IMPI).

It will be appreciated that at least part of any one or more of the above identified parameters could include a pointer to a BSF server instance. However, the UE-Id and/or the P-TID may be the most useful of these fields for inclusion of the pointer. The UE-Id might most usually be an MSISDN or an IMPU (which is of the form name@domain). These fields may contain designated components (for example, certain bits of bytes, or a domain name component, etc) that may identify the relevant BSF server instance in the cluster of BSF server instances.

The P-TID may be used to route the Zpn interface 175 to a particular BSF server instance if each BSF server instance handles P-TIDs in a particular sub-range of P-TID values. Thus, for a particular sub-range of P-TID values, the network could route Zpn 175 to one BSF server instance (for example, 130A), and for a different sub-range of P-TID values, the network could route Zpn 175 to a different BSF server instance (for example, 130B). Such a system might also be useful for subsequent tracking/auditing/problem resolution because you may be able to identify from the P-TID exactly which BSF server instance was used (for example, what country/server room it was in). It may be helpful in this aspect for there to be co-operation between different push NAFs when they are creating P-TIDs. By co-operating between each other, the P-TID values generated by the push NAFs may be distributed so as to prevent the push NAFs overloading their "favourite" BSF server instance by always generating P-TIDs that get routed to the same BSF server instance.

Furthermore, at least part of any other data passed from the NAF 122 to the BSF 130 during a push bootstrapping process may include a pointer to a particular BSF server instance, for example any parameters that might be exchanged as a result of tunnelling the Upa interface.

The data items that are passed from the NAF 122 to the BSF 130 may ultimately be under the control of the NAF 122 or different entity such as the network, depending on the data item. For example, the identifier of the UE (UE-Id) may be under the control of whoever sets the identifier (for example, the network), whereas the P-TID may be under the control of the NAF 122. Thus, the pointer to the BSF server instance may be under the control of the NAF 122 or a different entity such as the network.

In this way, the NAF 122 may contact a particular BSF server instance 130A at the start of a push bootstrapping process, for example to request a GPI, and then continue to contact the same BSF server instance 130A in all subsequent communications with the BSF 130. Thus, subsequent requests from the NAF 122 to the BSF 130 for a shared key (for example, a shared secret, such as Ks_NAF) and/or a security association for a particular UE 110 may be routed to the same BSF server instance 130A that provided the requested GPI and is therefore in a position to return the requested information correctly.

Optionally, the NAF 122 may keep a record of the pointer with an association to the UE 1 10 (for example, by storing a record of the pointer, or by any other means), so that for all subsequent communications with the BSF 130 relating to a particular UE 1 10, the NAF 122 may communicate with the correct BSF server instance. It may do this by including the pointer in any of the Zpn 175 parameters identified above. Additionally, or alternatively, where the identifier of the UE 1 10 (for example, UE-Id) comprises the pointer and/or the identifier of the shared secret (for example, the P-TID) comprises the pointer, the NAF 122 may include the identifier of the UE 1 10 and/or the identifier of the shared secret in subsequent communications with the BSF 130.

In a further aspect, a BSF server instance pointer is included in at least part of data that are supplied by the BSF 130 to the NAF 122 as part of the bootstrapping process (for example when sending the GPI response to the NAF 122).

For example, the GPI response may include data such as RAND and/or AUTN, one or both of which may comprise the pointer to the BSF server instance 130B that is transmitting the GPI response to the UE 1 10. Other information that might be passed from the BSF 130 to the NAF 122 are set out in TS 29.109, Section 5.4 (page 31) for Diameter, or Section 5.5 (page 34) for Web Services.

For example, these may be the Diameter response parameters, which may include at least one of: Vendor-Specific-Application-Id; Result-Code; Experimental-Result; Origin-Host (the address of the BSF 130); Origin-Realm (the realm of the BSF 130); User-Name (for example, the IMPI); ME-Key-Material; UICC-Key Material; Key-ExpiryTime; BootstrapInfoCreationTime; GBA-UserSecSettings (for example, selected USSs); GBA-Type; GBA-Push-Info; Security-Feature-Response; AVP; Proxy-Info; and/or Route-Record. It will be appreciated that any one or more of these parameters, or any other information that may be forwarded from the BSF 130 to the NAF 122, could comprise a pointer. However, the User-Name (for example, IMPI), the selected UserSecSettings (USS0, the ME-Key-Material, the UICC-Key-Material or any data contained in the GBA push information (GPI), may represent the most useful parameters for inclusion of a pointer.

After receiving the GPI response, the NAF 122 may optionally extract the pointer and make a record of it (for example, as part of the security association, NAF SA, that is kept on the NAF 122, or at a location accessible to the NAF 122) before forwarding the GPI to the UE 1 10 via Upa 155. Thus, the NAF 122 may use the pointer in subsequent communications with the BSF 130 so that the Zpn interface 175 may be routed to the correct BSF server instance 130B.

In a further alternative, rather than indicating a BSF server instance, the pointer might indicate a particular HLR/HSS. As shown in FIG. 6, there may be a number of different HLRs/HSSs 140A and 140B that the BSF 130 may contact as part of a bootstrapping process. The pointer may be set to identify a particular HLR/HSS that is to be used during the bootstrapping process (for example, when data transmitted from the NAF 122 to the BSF 130 at the start of the bootstrapping process comprises the pointer), or to identify a particular HLR/HSS that has been used during the bootstrapping process (for example, when data transmitted from the BSF 130 to the NAF 122 at a later time comprises the pointer).

When the BSF 130 receives the pointer (either from the NAF 122 during the process of push bootstrapping the shared secret to the UE 1 10, or subsequently from the NAF 122 when the NAF 122 is requesting the shared secret and/or a security association) the BSF 130 will be able to identify the HLR/HSS 140A or 140B that it should contact. For example, if the UE identifier comprises the pointer, the BSF 130 may resolve the identifier to a private identifier (such as an IMSI or IMPI), which may then allow the BSF 130 (or some further routing structure) to identify the particular HLR/HSS.

Thus, when the NAF 122 requests the shared secret, the BSF 130 will be able to obtain data from the correct HLR/HSS in order to return the shared secret or security association to the NAF 122 for the particular UE 1 10 (or return data using which the NAF 122 can derive the correct shared secret). The data obtained from the HLR/HSS might be data using which the BSF 130 (or the NAF 122) could derive the shared secret (for example, an authentication vector etc, as explained earlier). In this way, the Zpn 175 interface could be routed to any BSF server instance (which might be useful for dynamic load balancing etc), and the BSF 130 still be capable of retrieving the correct data for the shared secret associated with the particular UE 1 10, so that the NAF 122 can be supplied with the correct data.

In a further alternative, the pointer may identify both a particular BSF server instance 130A, 130B or 130C and also a particular HLR/HSS 140A or 140B, such that the Zpn interface 175 is routed to a particular BSF server instance and the BSF server instance can contact a particular HLR/HSS. In a further alternative, there may be two pointers, one identifying a particular BSF server instance 130A, 130B or 130C and the other identifying a particular HLR/HSS 140A or 140B.

In the above described aspects, the pointer may be anything that enables a network or routing structure to route a communications interface to a particular BSF server instance indicated by the pointer and/or that enables a BSF 130 or suitable routing structure to communicate with a particular HLR/HSS indicated by the pointer. The pointer could be an address, a domain, a selection of bits or bytes within a binary data field, such as a RAND (for example, most significant three bits), a selection of one or more digits within a numeric field, such as an IMSI (for example, least significant digit), a value within a particular range, a hint, a clue, a label etc. The pointer may enable the relevant entity (for example, a routing structure) to use a partitioning and routing rule based on the pointer to ensure that the correct server instance is contacted.

It is to be understood that the above description is given by way of example and only for the benefit of understanding the solution, and it must include also any combination of the above features, as well as any alterations, modifications or otherwise addition which could be done by a skilled person by use of his/her skills and/or general knowledge in the relevant and/or neighbouring art.

Many combinations, modifications, or alterations to the features of the above embodiments will be readily apparent to the skilled person and are intended to form part of the invention. Any of the features described specifically relating to one aspect or example may be used in any other aspect by making the appropriate changes.

In the above aspects, the BSF 130 comprises a cluster of three server instances 130A, 130B and 130C. However, it will be appreciated that in a scaled or distributed architecture, there may be any number (greater than or equal to two) of server instances comprising the BSF 130. Some or all of the server instances may be co-located, for example in the same server room, or in different locations, for example in different rooms or different geographic locations, for example different regions or countries.

Likewise, the above aspects show two HLRs/HSSs 140A and 140B. However, it will be appreciated that there may be any number (greater than or equal to two) of HLRs/HSSs that the BSF 130 could contact. They may be co-located, for example in the same server room, or in different locations, for example in different rooms or different geographic locations, for example different regions or countries.

In the above aspects, the pointer is used to indicate a particular BSF server instance and/or a particular HLR/HSS instance. However, the pointer could be used to indicate any particular server instance and not just a BSF server instance and/or HLR/HSS instance. In particular, the pointer may be used to identify any server instance (for example, a security server instance) that should be used during a bootstrapping process and/or that has a share of the bootstrapped shared secret (which may be because the server instance stores the shared secret or has access to a record of the shared secret, for example on a database or another server, or because the sever instance stores or has access to data using which the shared secret may be derived, either by the server instance or some other entity).

In the above, the requests made to the BSF 130 by the UE 110 and/or NAF 122 relate to requests for a shared secret. However, the requests could additionally or alternatively be for any other data related to a shared secret, for example the UE 110 and/or NAF 122 may request a lifetime of a shared secret etc. Alternatively, the above described aspects may be applied to communications between any entity and a bootstrapping server for any purpose, wherein a particular server instance is identified in the communications. For example, the above described use of pointers may be implemented as part of a process of establishing secure communication, for example between the NAF 122 and UE 110. Communications may be secured using a bootstrapped shared secret (either directly, or using keys derived from the bootstrapped shared secret) and the NAF 122 and/or UE 1 10 may request the shared secret and/or any other related information (such as a lifetime of the shared secret) as part of that process. Thus, it may be helpful for communications from the NAF 122 and/or UE 1 10 to the BSF 130 to comprise a pointer such that the correct server instance (for example, the correct BSF server instance and/or the correct HLR/HSS instance) may be contacted and the correct shared secret data thereby returned.

In the above, a GBA bootstrapping process and a GBA-push bootstrapping process is described. However, it will be appreciated that the above described use of pointers may be utilised with any bootstrapping protocols or architectures, for example device management (DM) bootstrapping etc. Furthermore, it will be understood that GBA bootstrapping may be any variation or flavour of GBA, for example GBA-ME, GBA-U, 2G-GBA, GBA-SIM, etc.

In the above, bootstrapping of a shared secret to a UE 1 10 is described. However, rather than a UE, the above described aspects could be applied to any suitable entity, for example an M2M device.

In the above, the NAF 122 is implemented as part of the DM server 120, for example as a plug-in component to the DM server 120. However, the NAF 122 may be any server or network component which terminates the Ua 150 interface from the UE 1 10 and uses a shared secret to secure communications on that interface. The NAF 122 may form at least part of the DM server 120 or may exist separately from the DM server 120. In this way, the NAF could be any application.

For example, the NAF 122 may be the DM server 120, i.e. the NAF 122 may be identical to the DM server 120, or it may be a plug-in component in the DM server 120.

Alternatively, the NAF 122 may act as a proxy in front of the DM server 120. As a proxy, the NAF 122 would terminate the connection from the UE 110 (thus acting as a server to the UE 1 10) and start a new connection with the DM server 120 (thus acting as a client to the DM server 12).

What is claimed is:

1. A bootstrapping server apparatus for use in implementing a bootstrapping process for establishing secure communications within a distributed system, the bootstrapping server apparatus comprising:
   a processor, and a memory storing computer readable instructions for execution by the processor to implement a method for establishing a shared secret that is shared between a device and the bootstrapping server, the method including:
   setting a reference to a security server instance that has access to shared secret data, the security server instance being selected from a plurality of server instances;
   transmitting, over a network interface between the bootstrapping server apparatus and a network application function (NAF), a data communication that includes data comprising the reference to the security server instance to the NAF as part of the bootstrapping process;
   wherein the data comprising the reference to the security server instance comprises push information for forwarding to the device as part of the bootstrapping process.

2. The bootstrapping server apparatus of claim 1, wherein the device is a user equipment device or a machine-to-machine (M2M) device.

3. The bootstrapping server apparatus of claim 2, wherein the data comprising the reference to the security server instance includes security data that comprises information relating to the shared secret, and wherein the NAF, upon receiving the data communication, uses the information relating to the shared secret to derive the shared secret as part of the bootstrapping process.

4. The bootstrapping server apparatus of claim 3, wherein the information relating to the shared secret is an identifier of the shared secret that comprises the reference to the security server instance.

5. The bootstrapping server apparatus of claim 1, wherein the push information includes bootstrapping data that is used in the bootstrapping process to derive the shared secret, and wherein the bootstrapping data comprises the reference to the security server instance.

6. The bootstrapping server apparatus of claim 1, wherein the reference to the security server instance is an identification of the security server instance.

7. The bootstrapping server apparatus of claim 1, wherein the reference to the security server instance is a pointer that enables routing of a communications interface to the security server instance.

8. The bootstrapping server apparatus of claim 7, wherein the method further includes instantiating a plurality of bootstrapping server instances and selecting a first bootstrapping server instance of the plurality of bootstrapping server instances as the security server instance to which the reference is set to indicate that the first bootstrapping server instance is used as part of the bootstrapping process.

9. The bootstrapping server apparatus of claim 8, wherein the method further comprises using the pointer to route a communications interface between the NAF or the device and the first bootstrapping server instance.

10. The bootstrapping server apparatus of claim 1, wherein the shared secret data comprises at least one of the shared secret, data based upon which the shared secret is derivable, and a lifetime of the shared secret.

11. The bootstrapping server apparatus of claim 10, wherein the security server instance comprises a home location register (HLR) or a home subscriber service (HSS) that stores the shared secret data and is used as part of the bootstrapping process.

12. The bootstrapping server apparatus of claim 11, wherein the method further comprises receiving a request for at least one of the shared secret and the lifetime of the shared secret that includes the reference to the security server instance, and using the reference to the security server instance to identify the HLR or HSS and retrieve the shared secret data from the HLR or HSS.

13. The bootstrapping server apparatus of claim 1, further comprising a data store that stores the shared secret data.

14. The bootstrapping server apparatus of claim 1, wherein the shared secret data is stored in a data storage system with which the bootstrapping server apparatus or the security server instance is communicatively coupled.

15. The bootstrapping server apparatus of claim 1, wherein the method further includes receiving a data communication that includes data comprising the reference to the security server instance from the NAF and using the reference to the security server instance to obtain information from the security server instance.

16. A bootstrapping server apparatus for use in implementing a bootstrapping process for establishing secure communications within a distributed system, the bootstrapping server apparatus comprising:
a processor, and a memory storing computer readable instructions for execution by the processor to implement a method for establishing secure communication between a device and a network application function (NAF), the method including:
receiving a first data communication that includes a request for at least one of a shared secret that is derivable from a key shared between the device and a security server instance having access to shared secret data and a lifetime of the shared secret, the security server instance being selected from a plurality of server instances;
using the reference to the security server instance to retrieve data from the security server instance that is usable to derive at least one of the shared secret and the lifetime of the shared secret; and
transmitting, over a network interface between the bootstrapping server apparatus and the NAF, a second data communication that includes data comprising a reference to the security server instance and the data retrieved from the security server instance or at least one of the shared secret and the lifetime of the shared secret to the NAF;
wherein the data comprising the reference to the security server instance comprises push information for forwarding to the device as part of the bootstrapping process.

17. The bootstrapping server apparatus of claim 16, wherein the device is a user equipment device or a machine-to-machine (M2M) device, and wherein the first data communication is a request to initiate a bootstrapping process received from the device over a network interface between the bootstrapping server apparatus and the device.

18. The bootstrapping server apparatus of claim 16, wherein the first data communication is received from the NAF over the network interface between the bootstrapping server apparatus and the NAF.

19. The bootstrapping server apparatus of claim 16, wherein the request includes at least one of an identifier of the shared secret and an identifier of the device, and wherein the at least one of an identifier of the shared secret and an identifier of the device comprises the reference to the security server instance.

20. The bootstrapping server apparatus of claim 16, wherein the security server instance comprises a home location register (HLR) or a home subscriber service (HSS) that stores the key.

* * * * *